(12) United States Patent
Chun

(10) Patent No.: US 12,317,174 B2
(45) Date of Patent: May 27, 2025

(54) COMMUNICATION RELATED TO NETWORK SLICE

(71) Applicant: LG Electronics Inc., Seoul (KR)

(72) Inventor: Sungduck Chun, Seoul (KR)

(73) Assignee: LG Electronics Inc., Seoul (KR)

(*) Notice: Subject to any disclaimer, the term of this patent is extended or adjusted under 35 U.S.C. 154(b) by 350 days.

(21) Appl. No.: 17/798,967

(22) PCT Filed: Jan. 22, 2021

(86) PCT No.: PCT/KR2021/000926
§ 371 (c)(1),
(2) Date: Aug. 11, 2022

(87) PCT Pub. No.: WO2021/162275
PCT Pub. Date: Aug. 19, 2021

(65) Prior Publication Data
US 2023/0074413 A1   Mar. 9, 2023

(30) Foreign Application Priority Data
Feb. 13, 2020  (KR) .................. 10-2020-0017913

(51) Int. Cl.
| | |
|---|---|
| H04W 48/14 | (2009.01) |
| H04W 24/10 | (2009.01) |
| H04W 48/18 | (2009.01) |
| H04W 60/00 | (2009.01) |

(52) U.S. Cl.
CPC .......... *H04W 48/14* (2013.01); *H04W 24/10* (2013.01); *H04W 48/18* (2013.01); *H04W 60/00* (2013.01)

(58) Field of Classification Search
None
See application file for complete search history.

(56) References Cited

U.S. PATENT DOCUMENTS

| | | | |
|---|---|---|---|
| 2012/0124466 A1* | 5/2012 | Sinn ...................... | G06Q 30/02 |
| | | | 715/255 |
| 2017/0086118 A1 | 3/2017 | Vrzic | |
| 2019/0349824 A1 | 11/2019 | Tsuda et al. | |
| 2022/0182861 A1* | 6/2022 | Youn ..................... | H04W 24/08 |
| 2022/0377659 A1* | 11/2022 | Venkataraman .. | H04W 72/0453 |

FOREIGN PATENT DOCUMENTS

| | | |
|---|---|---|
| EP | 3589064 | 1/2020 |
| WO | WO 2019063387 | 4/2019 |

OTHER PUBLICATIONS

3GPP TS 24.501 V16.3.0 (Dec. 2019), "3rd Generation Partnership Project; Technical Specification Group Core Network and Terminals; Non-Access-Stratum (NAS) protocol for 5G System (5GS); Stage 3 (Release 16)," Dec. 2019, 644 pages.

* cited by examiner

*Primary Examiner* — Srinivasa R Reddivalam
(74) *Attorney, Agent, or Firm* — Fish & Richardson P.C.

(57) ABSTRACT

A disclosure of the present specification provides a method of performing communication related to a network slice by a UE. The method may comprise the steps of receiving, from a network, network slice information of a serving cell and network slice information of a neighboring cell; determining that the neighboring cell provides a first network slice that the UE is to use; performing first measurement for a signal of the service cell and second measurement for a signal of the neighboring cell; and determining, on the basis of the first measurement and the second measurement, whether to select the neighboring cell.

14 Claims, 19 Drawing Sheets

US 12,317,174 B2

COMMUNICATION RELATED TO NETWORK SLICE

CROSS-REFERENCE TO RELATED APPLICATIONS

This application is a National Stage application under 35 U.S.C. § 371 of International Application No. PCT/KR2021/000926, filed on Jan. 22, 2021, which claims the benefit of Korean Patent Application No. 10-2020-0017913, filed on Feb. 13, 2020. The disclosures of the prior applications are hereby incorporated by reference herein in their entirety.

TECHNICAL FIELD

The present specification relates to mobile communications.

BACKGROUND

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

For the fifth generation (so-called 5G) mobile communication, a new radio access technology (New RAT or NR) has been studied.

5G mobile communication, defined by the International Telecommunication Union (ITU), refers to providing a data transmission rate of up to 20 Gbps and a perceived transmission rate of at least 100 Mbps anywhere. The official name is 'IMT-2020', and it aims to commercialize it worldwide in 2020.

Meanwhile, in 5G mobile communication, communication based on network slices has been introduced. The network may configure a supported network slice for each cell or for each TA (Tracking Area). However, a method for supporting the terminal to effectively select (or reselect) a network slice to which it wants to receive a service has not been discussed.

SUMMARY

Accordingly, a disclosure of the present specification has been made in an effort to solve the aforementioned problem.

In order to solve the above problems, one disclosure of the present specification provides a method for a UE to perform communication related to a network slice. The method includes: receiving network slice information of a serving cell and network slice information of a neighboring cell from a network; determining that the neighboring cell provides a first network slice that the UE intends to use; performing a first measurement on the signal of the serving cell and a second measurement on the signal of the neighboring cell; and determining whether to select the neighboring cell based on the first measurement and the second measurement.

In order to solve the above problems, one disclosure of the present specification provides a method for a base station to perform communication related to a network slice. The method includes: receiving a registration request message including information related to a first network slice from the UE; receiving a PDU session establishment request message including information related to a first network slice from the UE; and transmitting network slice information of the base station and network slice information of neighboring cells to the UE.

In order to solve the above problems, one disclosure of the present specification provides a UE that performs communication related to a network slice. The UE includes at least one processor; and at least one memory for storing instructions and operably electrically connectable with the at least one processor, wherein the operations performed based on the instructions being executed by the at least one processor include: receiving network slice information of a serving cell and network slice information of a neighboring cell from a network; determining that the neighboring cell provides a first network slice that the UE intends to use; performing a first measurement on the signal of the serving cell and a second measurement on the signal of the neighboring cell; and determining whether to select the neighboring cell based on the first measurement and the second measurement.

In order to solve the above problems, one disclosure of the present specification provides a base station for performing communication related to a network slice. The network node includes at least one processor; and at least one memory for storing instructions and operably electrically connectable with the at least one processor, wherein the operations performed based on the instructions being executed by the at least one processor include: receiving a registration request message including information related to the first network slice; receiving a PDU session establishment request message including information related to a first network slice from the UE; and transmitting network slice information of the base station and network slice information of neighboring cells to the UE.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations performed include: identifying network slice information of a serving cell and network slice information of a neighboring cell received from a network; determining that the neighboring cell provides a first network slice that the UE intends to use; performing a first measurement on the signal of the serving cell and a second measurement on the signal of the neighboring cell; and determining whether to select the neighboring cell based on the first measurement and the second measurement.

In order to solve the above problems, one disclosure of the present specification provides a non-volatile computer-readable storage medium in which instructions are recorded. The instructions, when executed by one or more processors, cause the one or more processors to: identify network slice information of a serving cell and network slice information of a neighboring cell received from a network; determining that the neighboring cell provides a first network slice that the UE intends to use; performing a first measurement on the signal of the serving cell and a second measurement on the signal of the neighboring cell; and determining whether to select the neighboring cell based on the first measurement and the second measurement.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DESCRIPTION OF EXEMPLARY EMBODIMENTS

Figure 1:
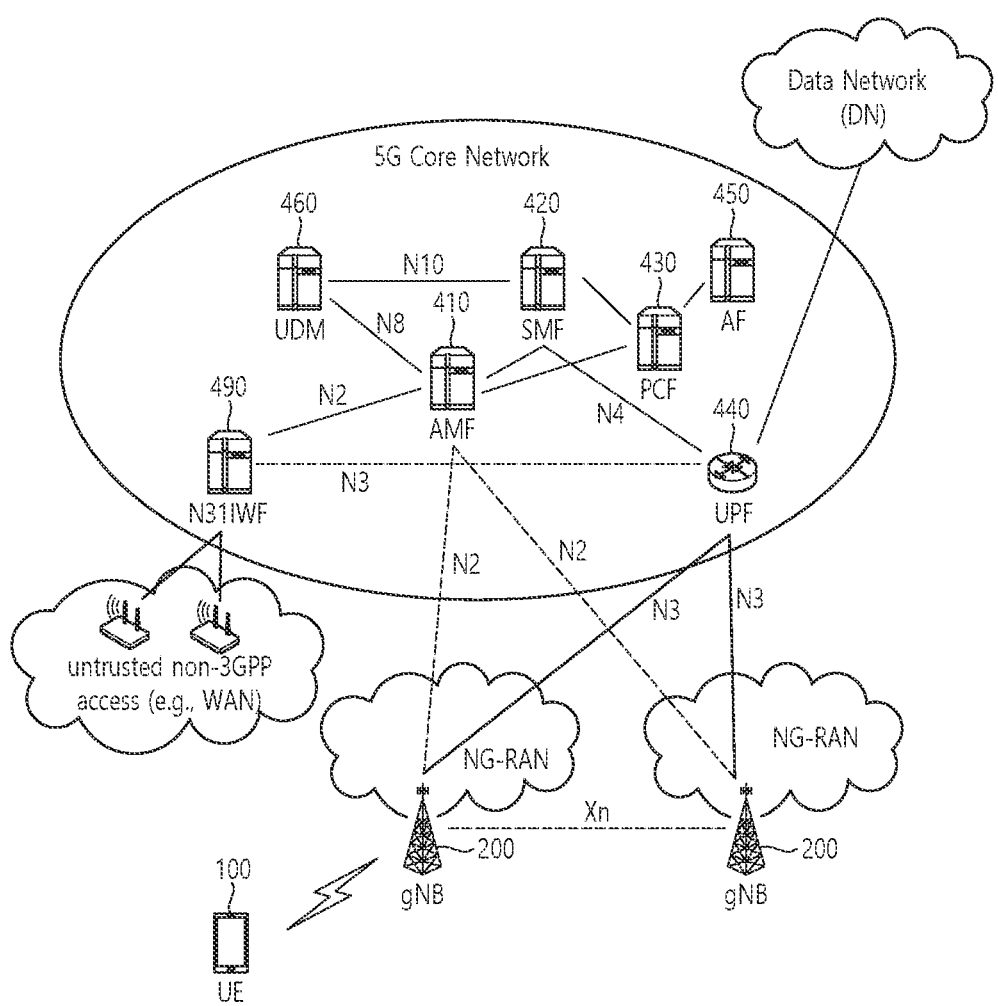
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and it may be called another term such as an evolved-NodeB (eNodeB), an evolved-NodeB (eNB), a BTS (Base Transceiver System), an access point (Access Point), gNB (Next generation NodeB), etc.

I. Techniques and Procedures Applicable to the Disclosure of the Present Specification FIG. 1 is a Structural Diagram of a Next-Generation Mobile Communication Network.

5GC(5G Core) may include various components, part of which are shown in FIG. 1, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP(3rd Generation Partnership Project) interworking function (N3IWF) 490.

A UE 100 is connected to a data network via the UPF 440 through a Next Generation Radio Access Network (NG-RAN) including the gNB 200.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 200 and the SMF 420. In addition, when the UE 100 moves over an area served by the gNB 200, the UPF 440 serves as a mobility anchor point. The UPF 440 may perform a function of handling a PDU. For mobility within the NG-RAN (which is defined after 3GPP Release-15), the UPF 440 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be called millimeter wave (mmWave).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 4100 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHk, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
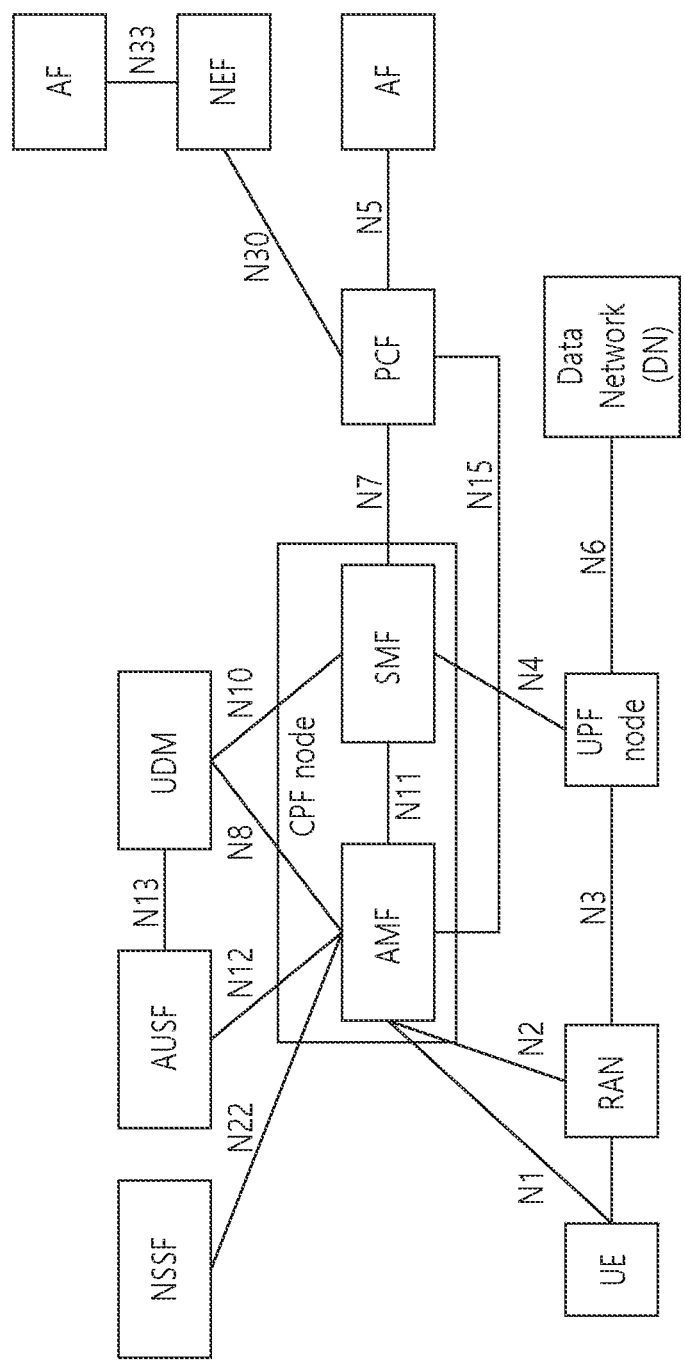
FIG. 2 is an exemplary diagram illustrating an expected structure of next-generation mobile communication from the viewpoint of a node.

FIG. 2 is an Exemplary Diagram Illustrating a Predicted Structure of a Next Generation Mobile Communication in Terms of a Node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
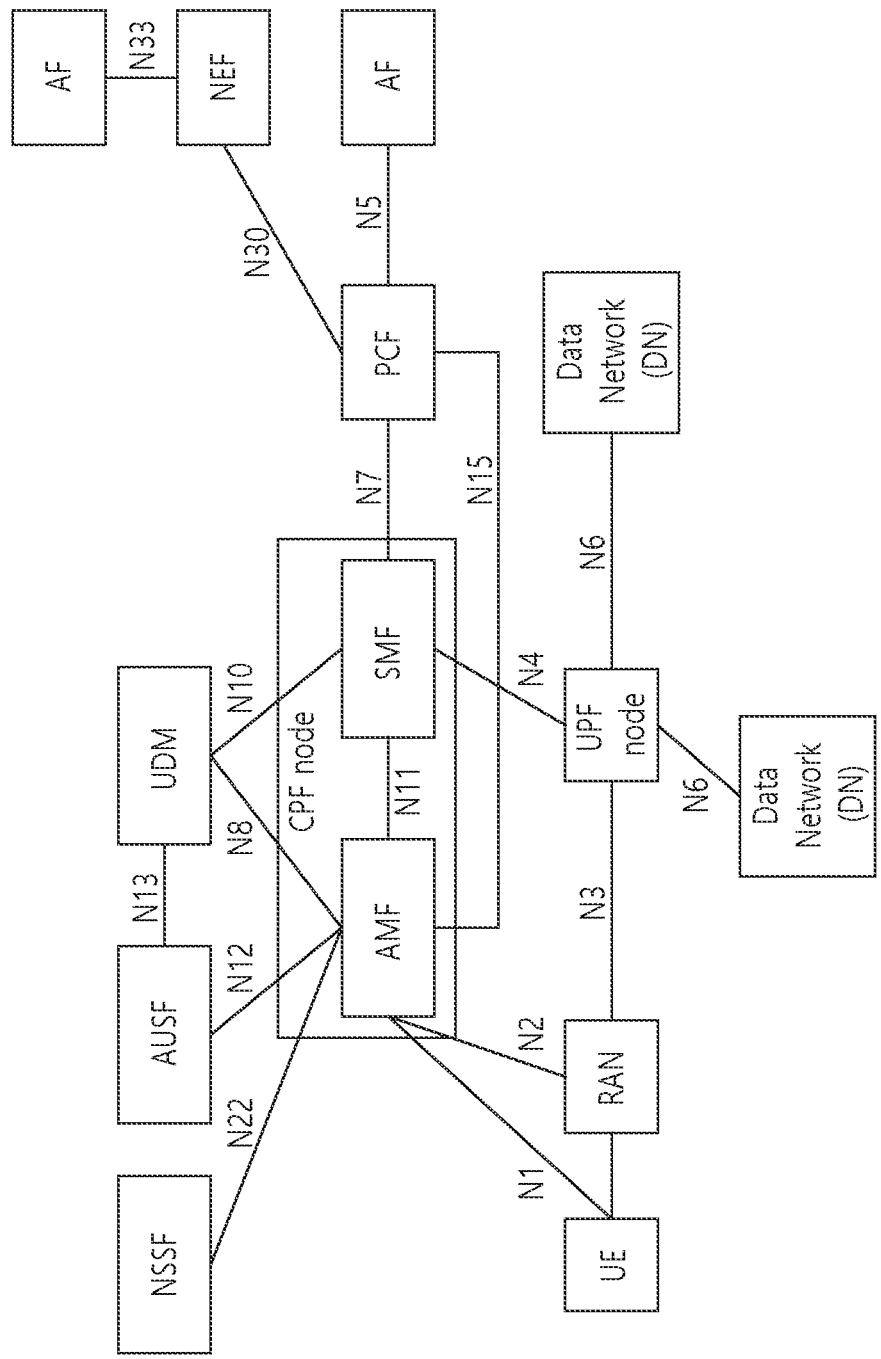
FIG. 3 is an exemplary diagram illustrating an architecture for supporting simultaneous access to two data networks.

In FIG. 3, the UE may simultaneously access two data networks using multiple PDU sessions.

FIG. 3 Illustrates an Architecture that Allows the UE to Simultaneously Access Two Data Networks Using One PDU Session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
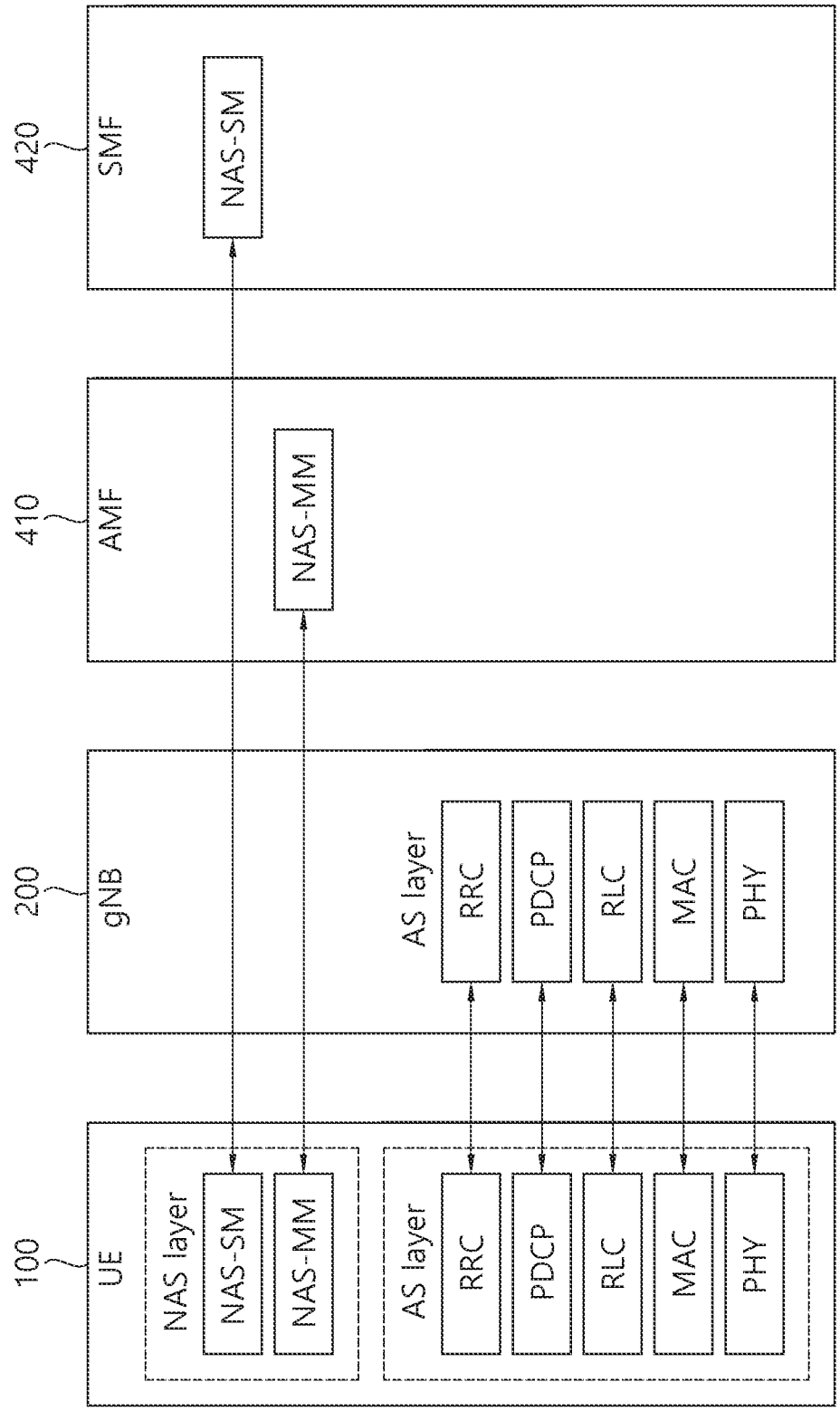
FIG. 4 is another exemplary diagram showing the structure of a radio interface protocol (Radio Interface Protocol) between the UE and the gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)
2) The NAS entity for SM performs session management between the UE and the SMF.
  The SM signaling message is processed, that is, generated and processed, at an NAS-SM layer of the UE and SMF. The contents of the SM signaling message are not interpreted by the AMF.
  In the case of SM signaling transmission,
    The NAS entity for the MM creates a NAS-MM message that derives how and where to deliver an SM signaling message through a security header representing the NAS transmission of SM signaling and additional information on a received NAS-MM.
    Upon receiving SM signaling, the NAS entity for the SM performs an integrity check of the NAS-MM message, analyzes additional information, and derives a method and place to derive the SM signaling message.
  Meanwhile, in FIG. 4, the RRC layer, the RLC layer, the MAC layer, and the PHY layer located below the NAS layer are collectively referred to as an access stratum (AS).
  A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.
  In the system for 5G, AMF performs registration management (RM: Registration Management) and connection management (CM: Connection Management) for 3GPP access as well as non-3GPP access.
  A Multi-Access (MA) PDU session using both 3GPP access and non-3GPP access may be used.
  The MA PDU session is a PDU session that can be serviced simultaneously with 3GPP access and non-3GPP access using one PDU session.

Figure 5A:
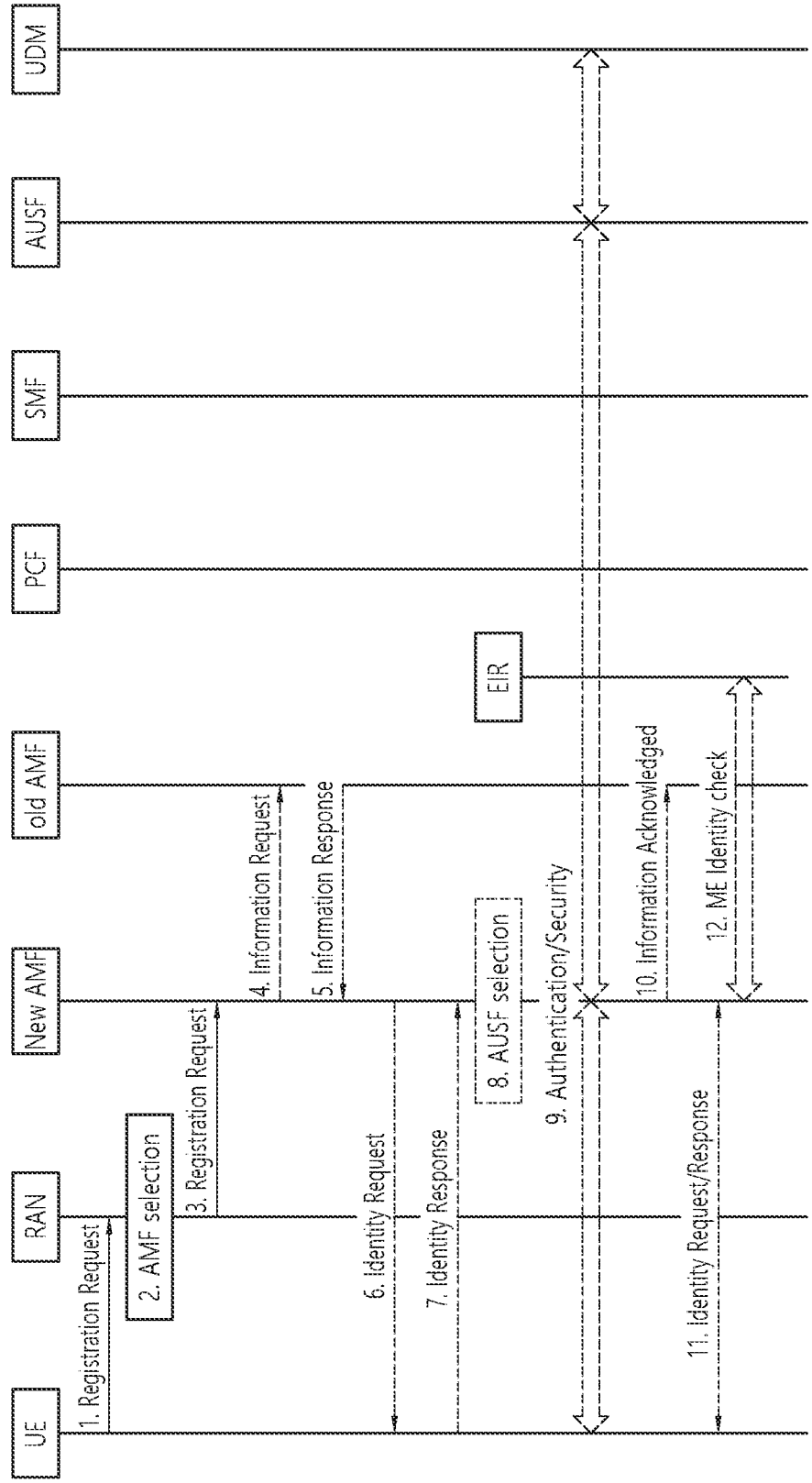
FIGS. 5A and 5B are signal flow diagrams illustrating an exemplary registration procedure.
Figure 5B:
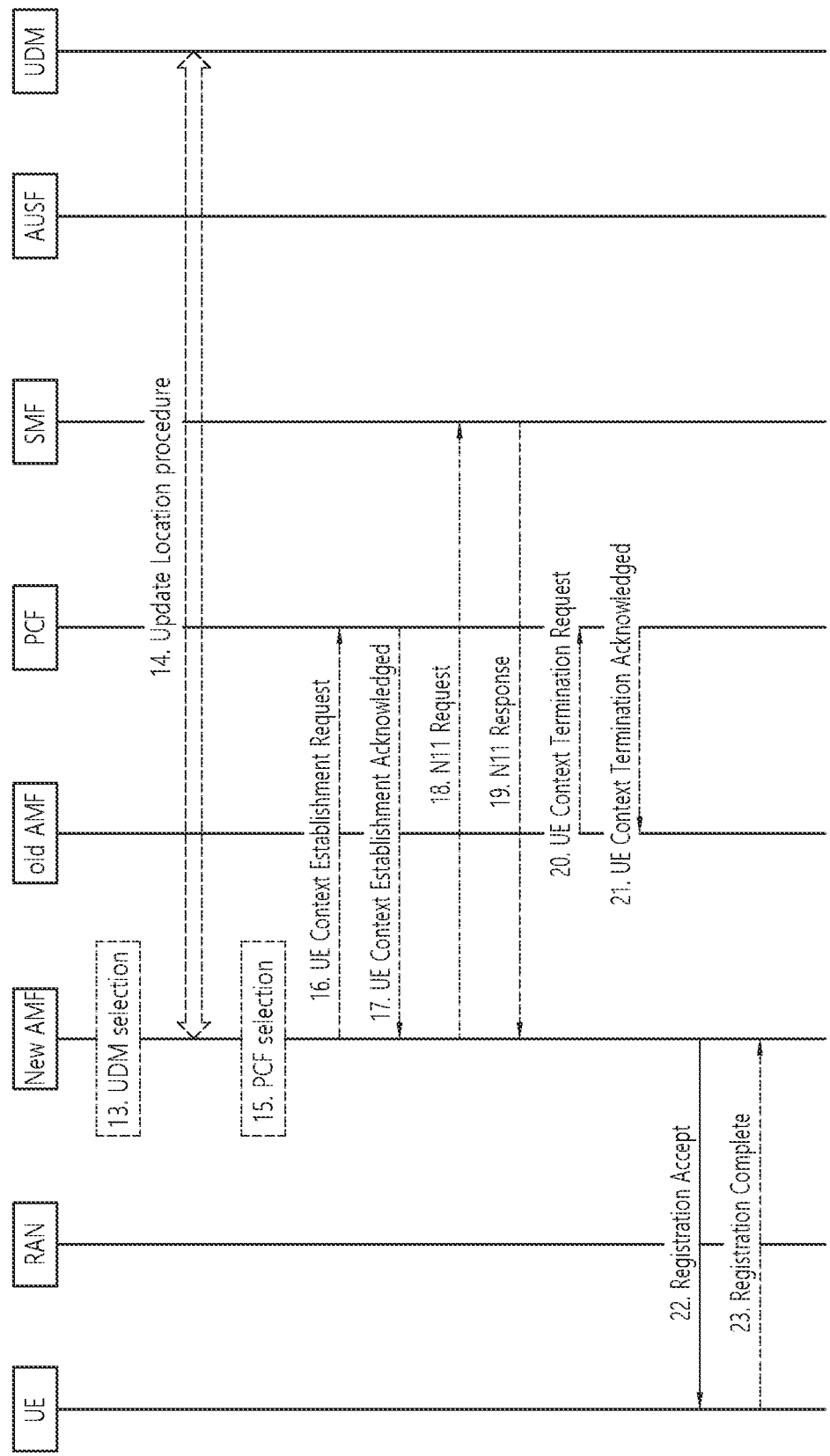

<Registration Procedure>
  The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving to a new tracking area (TA) whine the UE is in an idle mode, and when the UE needs to perform periodic registration update.
  During the initial registration procedure, the ID of the UE may be obtained from the UE. AMF may deliver PEI (IMEISV) to UDM, SMF and PCF.
FIGS. 5A and 5B are Signal Flowcharts Showing an Exemplary Registration Procedure.
  1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU(protocol data unit) session status, and so on.
  In case of a 5G RAN, the AN parameter may include a SUPI or a temporary user ID, a selected network, and NASSAI.
  The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.
  The security parameter may be used for authentication and integrity protection.
  The PDU session status indicates a PDU session that is available (and previously configured) in the UE.
  2) In case the SUPI is included, or in case the temporary user ID does not indicate a valid AMF, the RAN may select an AMF based on a (R)AT and NSSAI.
  In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.
  3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.
  When a 5G-RAN is used, the N2 parameter includes location information related to a cell in which the UE is camping, a cell identifier, and a RAT type.
  If the registration type indicated by the UE is a periodic registration update, Process 4 to Process 17, which will be described in detail later on, may not be performed.
  4) The newly selected AMF may transmit an information request message to the previous AMF.
  In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.
  5) The previous (or old) AMF transmits an information response message to the newly selected AMF. The information response message may include SUPI, MM context, and SMF information.
  More specifically, the previous (or old) AMF transmits an information response message including SUPI and MM context of the UE.
    In case information on an active PDU session is included in the previous (or old) AMF, SMF information including SMF ID and PDU session ID may be included in the information response message of the previous (or old) AMF.
  6) In case the SUPI is not provided by the UE, or in case the SUPI is not searched from the previous (or old) AMF, the new AMF transmits an Identity Request message to the UE.
  7) The UE transmits an Identity Response message including the SUPI to the new AMF.
  8) The AMF may determine to perform triggering of an AUSF. In this case, the AMF may select an AUSF based on the SUPI.
  9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI(Session Network Slice Selection Assistance Information) of the allowed NSSAI (Network Slice Selection Assistance Information) to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU(Protocol Data Unit) Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
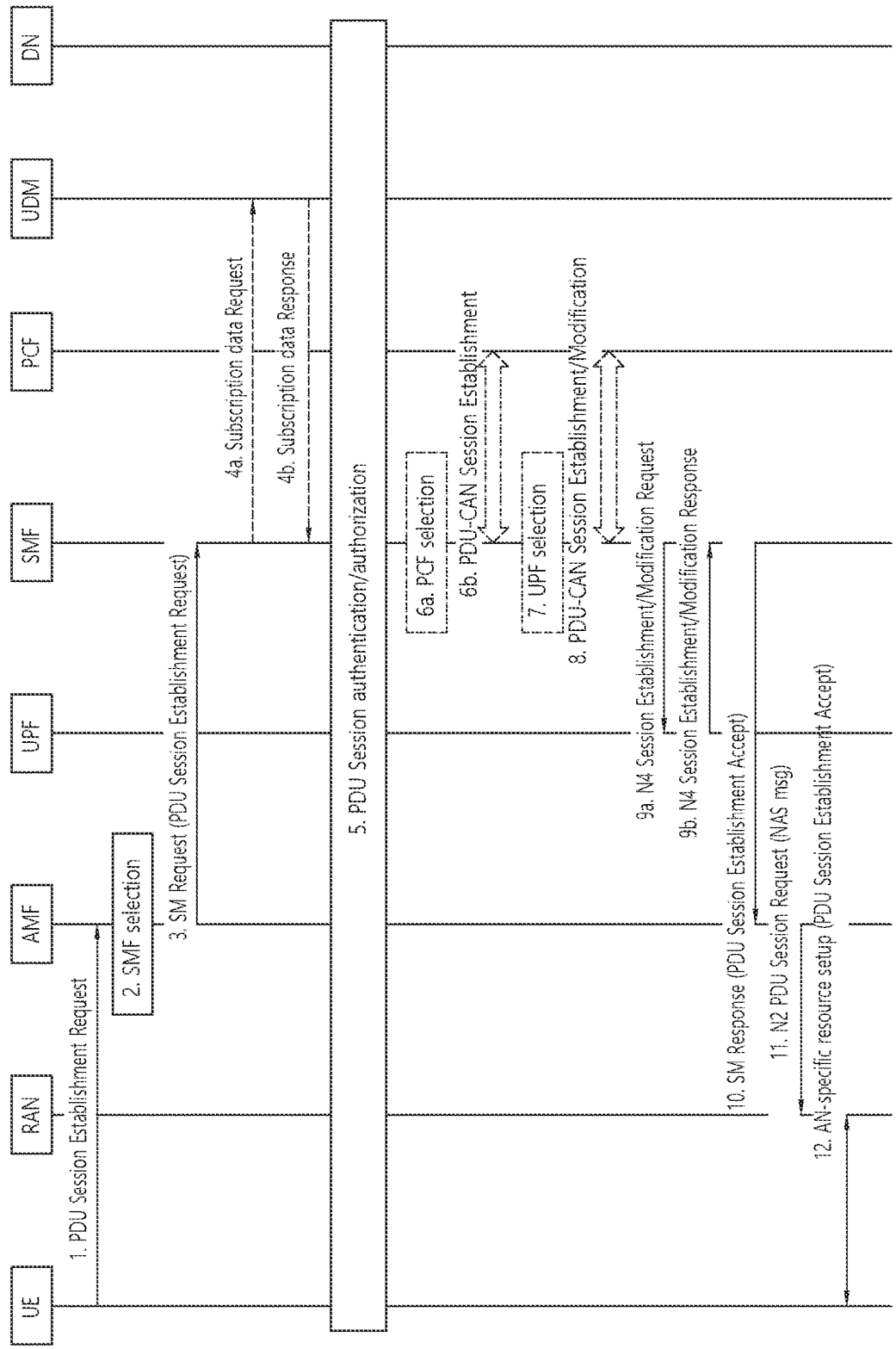
FIGS. 6A and 6B are signal flow diagrams illustrating an exemplary PDU session establishment procedure.
Figure 6B:
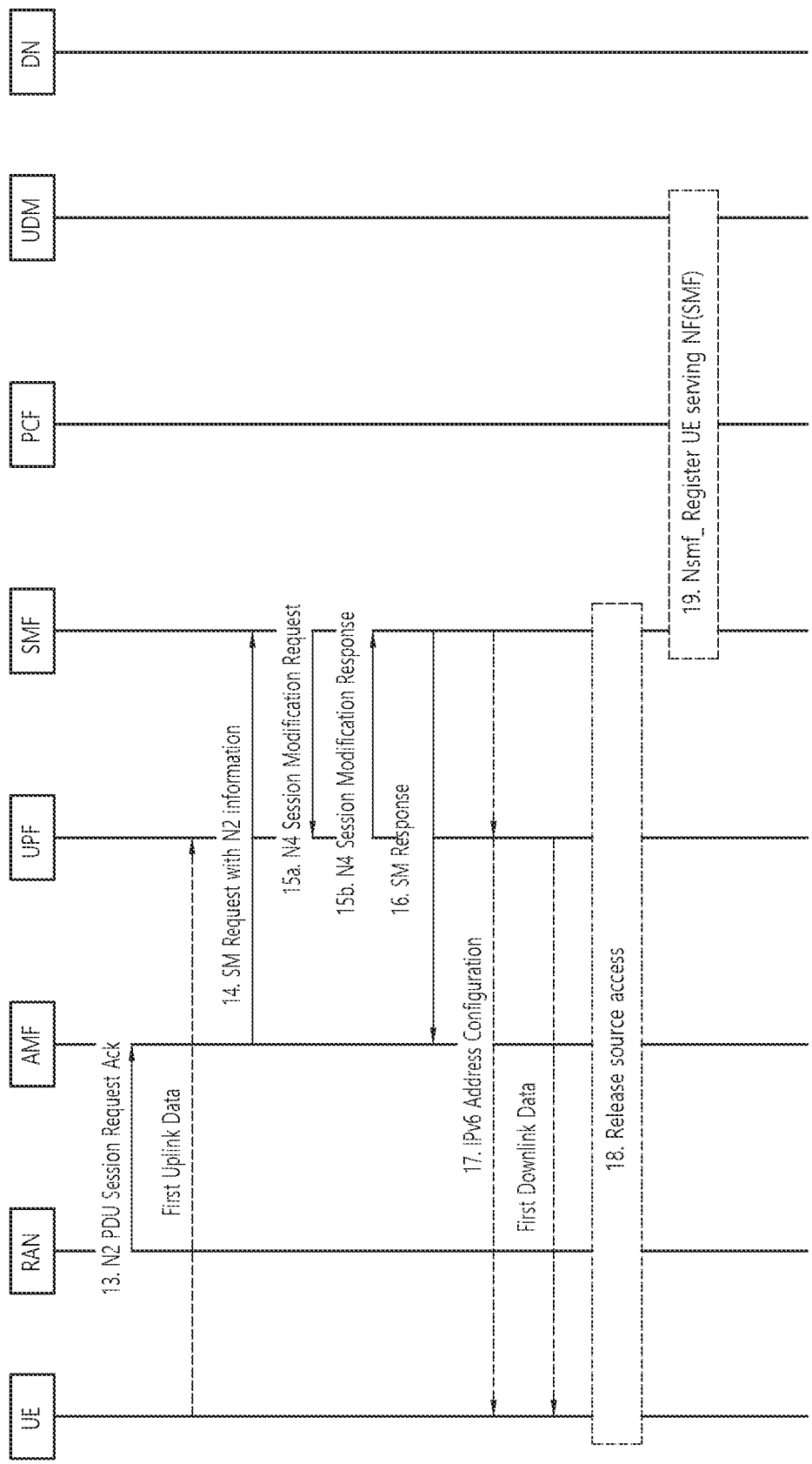

FIGS. 6A and 6B are a Signal Flowchart Illustrating an Exemplary PDU Session Establishment Procedure.

The procedure shown in FIGS. 6A and 6B assumes that the UE has already registered on the AMF according to the registration procedure shown in FIGS. 5A and 5B. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5A and 5B. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<Cell Selection and Cell Recelection>

In the mobile communication system, it is assumed that the terminal continuously moves. Accordingly, in order to maintain the radio section between the terminal and the base station in an optimal state, the terminal may continuously perform a cell selection/reselection process.

A UE (eg, UE) may perform measurement for cell selection and cell reselection. For example, the UE may evaluate Srxlev and Squal of the non-serving cell. When the UE evaluates the Srxlev and Squal of the non-serving cell for the purpose of cell reselection, the UE may use parameters provided by the serving cell. Here, the non-serving cell means a cell other than the serving cell of the UE. When the UE evaluates the Srxlev and Squal of the non-serving cell for final check for cell selection criteria (criterion), the UE may use parameters provided by the target cell for cell reselection.

For reference, here, Srxlev may mean a cell selection Rx level value. Srxlev may be determined based on the strength of the cell signal received by the UE. For example, the UE may measure Reference Signal Received Power (RSRP) based on a signal received from the cell, and may determine Srxlev based on the measured RSRP. Srxlev Squal may mean a cell selection quality value. For example, the UE may measure Reference Signal Received Quality (RSRQ) based on a signal received from the cell, and determine Squal based on the measured RSRQ.

The NAS (eg, the NAS layer of the UE) may control RATs (Radio Access Technology) to which cell selection should be performed. For example, the NAS may control RATs, by displaying the RAT associated with the selected Public Land Mobile Network (PLMN), and by maintaining a list of forbidden registration area(s) and a list of equivalent PLMNs. The UE may select a suitable cell based on the RRC IDLE status measurement or RRC_INACTVE status measurement and cell selection criteria.

To process the cell selection process quickly, the UE may use the stored information for multiple RATs, if possible.

When the UE camps on a cell, the UE may periodically search for a better cell according to cell reselection criteria. When a better cell is found, the UE may select the corresponding cell. When a cell is changed, the RAT may be changed.

When the received system information related to the NAS (eg, the NAS layer of the terminal) is changed due to cell selection or cell reselection, the NAS may receive the information related to the change.

Hereinafter, a measurement rule for cell reselection will be described.

The UE may limit needed measurements using the following rules:

If the serving cell satisfies "Srxlev>SIntraSearchP" and "Squal>SIntraSearchQ", the UE may choose not to perform intra-frequency measurement. Here, Srxlev may mean a cell selection Rx level value. Squal may mean a cell selection quality value. SIntraSearchP may mean a threshold value used to determine whether to perform intra-frequency measurement. SIntraSearchQ may mean a threshold value used to determine whether to perform intra-frequency measurement.

Otherwise, the UE may perform intra-frequency measurement.

The UE may apply the following rules for NR inter-frequency and inter-RAT frequency. For example, when the following rules for NR inter-frequency and inter-RAT frequency are indicated by system information, and priority for NR inter-frequency and inter-RAT frequency is provided, the UE may apply the following rules:

If the reselection priority of the NR inter-frequency or inter-RAT frequency is higher than the reselection priority of the current NR frequency, the UE may perform measurement on NR inter-frequency or inter-RAT frequency having high priority.

When the reselection priority of the NR inter-frequency is equal to or lower than the reselection priority of the current NR frequency, and when the reselection priority of the inter-RAT frequency is equal to or lower than the reselection priority of the current NR frequency In this case, the following rules may apply:

If the serving cell satisfies "Srxlev>SIntraSearchP" and "Squal>SIntraSearchQ", the UE may choose not to perform measurement on an NR inter-frequency or inter-RAT frequency having a priority equal to or lower than the current NR frequency;

Otherwise, the UE may perform measurement on an NR inter-frequency or inter-RAT frequency having a priority equal to or lower than the current NR frequency.

<Network Slice>

Hereinafter, network slicing to be introduced in next-generation mobile communication will be described.

Next-generation mobile communication introduces the concept of network slicing in order to provide various services through one network. Here, the network slicing is a combination of network nodes having functions necessary to provide a specific service. A network node constituting a slice instance may be a hardware independent node or a logically independent node. By utilizing the network slice, the 3GPP communication system can virtualize network resources for efficient use of network resources. By utilizing the network slice, the 3GPP communication system can configure several virtual networks through virtualized network resources.

Each slice instance may be composed of a combination of all nodes necessary to configure the entire network. In this case, one slice instance may independently provide a service to the UE.

Alternatively, the slice instance may be composed of a combination of some nodes among nodes constituting the network. In this case, the slice instance may not provide a service to the UE alone, but may provide a service to the UE in association with other existing network nodes. In addition, a plurality of slice instances may provide a service to the UE in association with each other.

A slice instance is different from a dedicated core network in that the entire network node including the Core Network (CN) node and the RAN can be separated. In addition, a slice instance is different from a dedicated core network in that network nodes can simply be logically separated.

For reference, for a network slice, quota may be used.

For example, a quota related to a network slice may include a quota for the maximum number of UEs. The quota for the maximum number of UEs may mean the maximum number of terminals that can use a network slice at the same time. As an example, each network slice information may include quota information for the maximum number of UEs (eg, 10 pieces, 1000000 pieces, etc.).

For example, a quota related to a network slice may include a quota for the maximum number of PDU sessions. The quota for the maximum number of PDU sessions may mean the maximum number of concurrent PDU sessions supported in the network slice. For example, the maximum number of concurrent (concurrent) PDU sessions supported in a network slice may mean the maximum number of PDU sessions established at the same time in one network slice related to a DNN (Data Network Name) defined by S-NSSAI.

Figure 7:
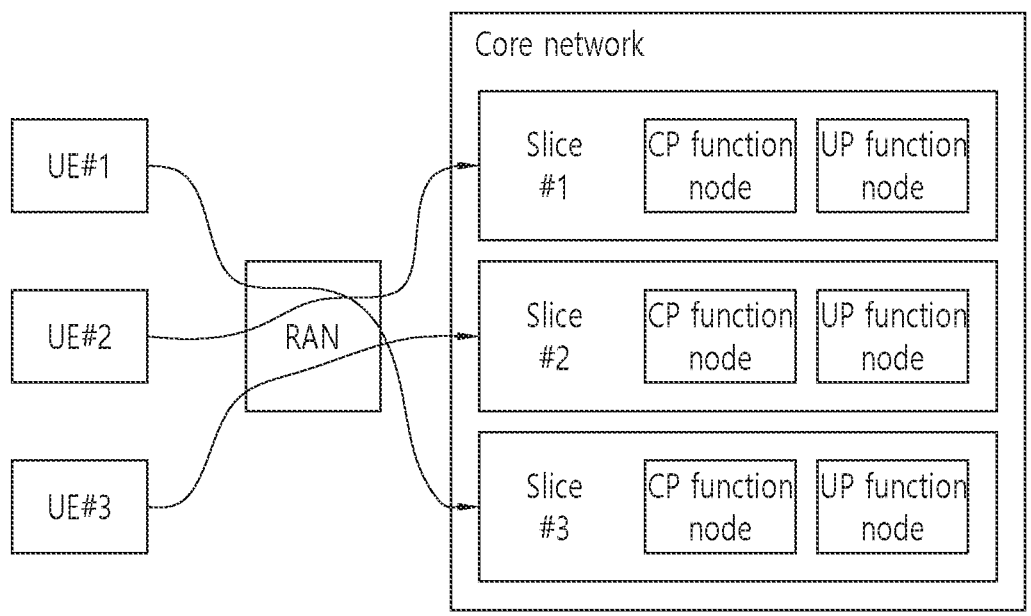
FIG. 7 is an exemplary diagram illustrating an example of an architecture for implementing the concept of network slicing.

FIG. 7 is an Exemplary Diagram Illustrating an Example of an Architecture for Implementing the Concept of Network Slicing.

As can be seen with reference to FIG. 7, the Core Network (CN) may be divided into several slice instances. Each slice instance may include one or more of a CP function node and a UP function node.

Each UE may use a network slice instance suitable for its own service through the RAN.

Unlike shown in FIG. 7, each slice instance may share one or more of a CP function node and a UP function node with another slice instance. This will be described with reference to FIG. 8 as follows.

Figure 8:
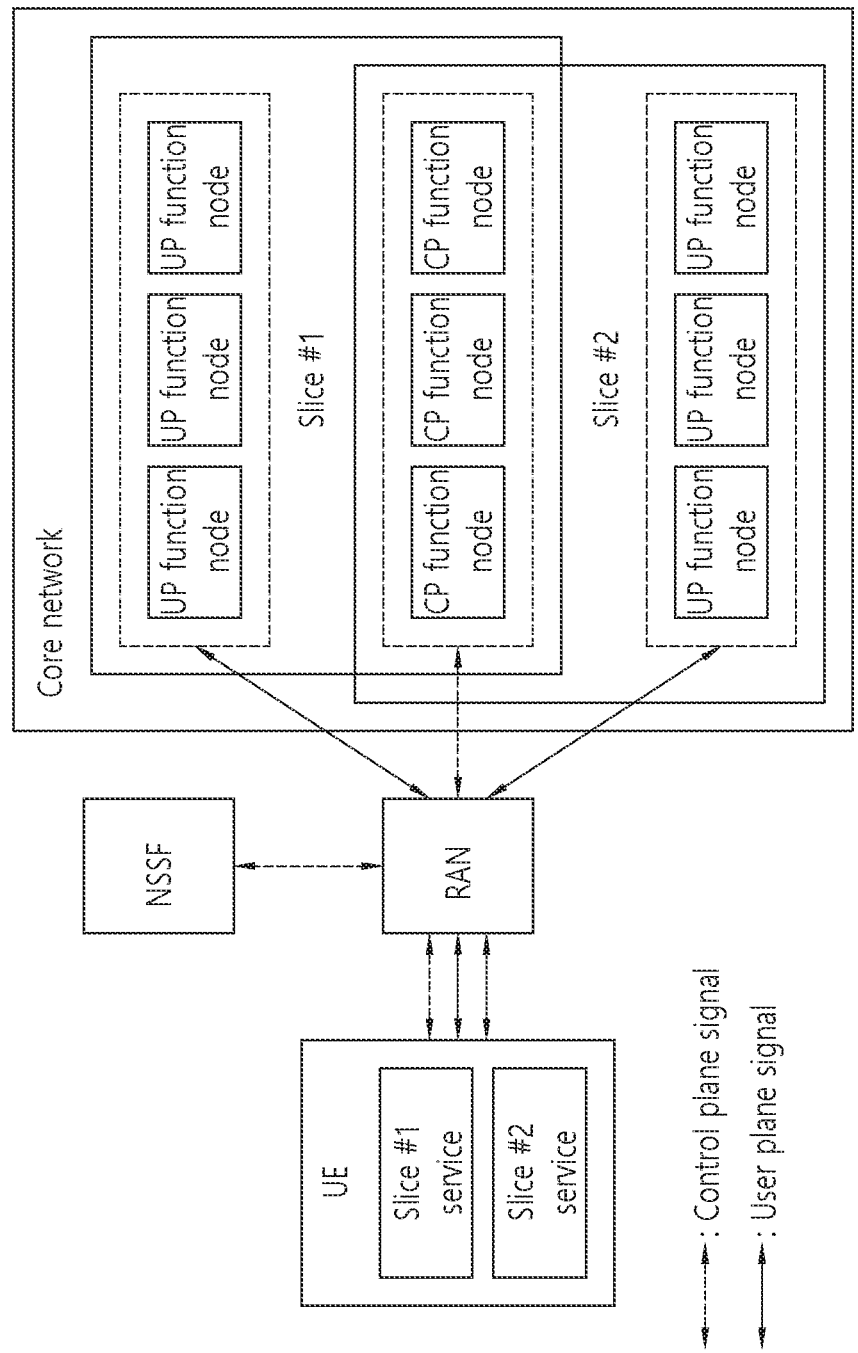
FIG. 8 is an exemplary diagram illustrating another example of an architecture for implementing the concept of network slicing.

FIG. 8 is an Exemplary Diagram Illustrating Another Example of an Architecture for Implementing the Concept of Network Slicing.

Referring to FIG. 8, a plurality of UP functional nodes is clustered, and similarly, a plurality of CP functional nodes is also clustered.

And, referring to FIG. 8, slice instance #1 (or referred to as instance #1) in the core network includes the first cluster of UP functional nodes. And, the slice instance #1 shares a cluster of CP functional nodes with slice #2 (or referred to as instance #2). The slice instance #2 includes a second cluster of UP functional nodes.

The illustrated NSSF selects a slice (or instance) that can accommodate the service of the UE.

The illustrated UE may use service #1 through the slice instance #1 selected by the NSSF, and may use service #2 through the slice instance #2 selected by the NSSF.

II. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below.

By supporting the network slice, the operator can classify each service subscriber according to a certain criterion or business purpose. In particular, the operator may provide a service to the subscriber by designating different network slices according to the characteristics of each subscriber group.

For example, an operator may group subscribers belonging to a specific campus and allocate a network slice for them. Alternatively, the operator may allocate a network slice for communication between terminals in a terminal group associated with a specific hardware (eg, a group consisting of terminals mounted on a specific car model). In this case, the specific network slice can be used only by users permitted to access the corresponding network slice.

One terminal or a subscriber (or user) of the terminal may subscribe to several different network slices. For example, a user may subscribe to a network slice A for campus, a network slice B assigned to his apartment house, and a network slice C for the navigation of his vehicle.

As in the above example, when the terminal subscribes to different network slices, the terminal may request access to network slices that need to be used at the same time according to its activated application. When access is allowed, the UE may use the corresponding network slice.

On the other hand, from the point of view of a network and/or an operator that needs to support a large number of users, when various network slices exist, various requirements may need to be satisfied. For example, there may be a requirement that each network slice should be configured to provide the characteristics of a communication network suitable for a set purpose, and that the available time of network slices requested by each UE should be maximized.

As the 5G communication system is advanced, the number of terminals requiring ultra-delay access and/or ultra-reliable access such as factory machines has increased. Network slices with such communication characteristics (eg, ultra-delay and/or ultra-reliable access) may need to be made available only on a specific frequency or specific region, or be unaffected by other network slices. To this end, the network operator wants to configure and/or implement each network slice to be available only in a specific region or in a specific region.

However, in the prior art, there was no method to support the effective access of the terminal to the network slice. For example, there is no way to maximize the available time during which the terminal can access a network slice from which it wants to receive a service. Specifically, when the terminal wants to use a network slice, the terminal may transmit information on one or more network slices that it intends to use to the serving cell by including it in a NAS message. If the serving cell supports a specific network slice, the serving cell transmits information about allowed slices to the UE, if the serving cell does not support a specific network slice, the serving cell transmits information about the rejected slice to the terminal. In a state where the terminal does not know which network slice is supported by a current serving cell and which network slice is not supported by the current serving cell, the terminal requests the serving cell to provide a service related to the network slice. For this reason, there is a problem in that signaling between the terminal and the network increases. In addition, there is a problem that the terminal cannot know at all in which cell a network slice that is not currently provided by the terminal is provided.

Accordingly, the disclosure of the present specification intends to propose a method for effectively supporting a terminal to access a network slice. For example, a method of maximizing the available time during which the terminal can access a network slice to which it wants to receive a service is proposed.

According to the disclosure of the present specification, in a cell (eg, serving cell) in which the terminal is staying, through a System Information Block (SIB), or by using information received from the core network, the terminal may obtain information on a network slice that can be provided in the current cell. For example, the serving cell may transmit information on a network slice that it can provide to the UE. Alternatively, the core network may transmit information on a network slice that can be provided by the serving cell of the terminal to the terminal. Additionally, the UE may acquire information on a network slice that can be provided by its neighboring cell (or neighboring cell). For reference, hereinafter, an adjacent cell and a neighboring cell may be used interchangeably with the same meaning. For example, the serving cell of the terminal may transmit information on a network slice that can be provided by a neighboring cell of the terminal to the terminal. Alternatively, the neighboring cell may transmit information on the network slice that it can provide to the UE.

For example, the UE may be staying in cell C1 using the frequency F1. In this case, the UE acquires information on network slices supported by C1 through the SIB of C. For example, cell C1 may include information on a network slice supported by the cell C1 in the SIB and transmit it to the UE. In addition, the UE may obtain information about a network slice provided by a neighboring cell of C1, for example, cell C2 using the same frequency F1, through the SIB of cell C1. In addition, the UE may obtain information about the network slice provided by the neighboring cell of C1, for example, cell C3 using another frequency F2, through the SIB of cell C1. For example, cell C1 may include information on a network slice provided by cell C2 and/or information on a network slice provided by cell C3 in the SIB to transmit to the UE.

Alternatively, the UE may obtain the information (eg, network slice information of a serving cell and/or network slice information of a neighboring cell) while the UE performs a registration procedure with the core network. For example, while the UE performs a registration procedure (eg, the registration procedure described with reference to FIGS. 5A and 5B), the core network may transmit the network slice information of the serving cell of the UE and/or the network slice information of the neighboring cells to the UE. The information (eg, network slice information) may be provided for each frequency or for each tracking area (TA)unit. To describe an example in which network slice information is provided for each frequency, the serving cell may transmit network slice information usable in F1 and network slice information usable in F2 to the UE. To describe an example in which network slice information is provided for each TA unit, the serving cell may transmit network slice information provided from TA1 and network slice information provided from TA2 to the UE.

The UE may check whether a neighboring cell providing the network slice requested by the UE exists based on the received network slice information according to the examples described above. For example, the terminal may request the serving cell for a network slice to which it wants to receive a service. Even if the terminal has requested, if the terminal does not receive permission for the network slice or the serving cell does not provide the corresponding network slice, based on the obtained network slice information, the terminal may check whether the neighboring cell provides the corresponding network slice. If the terminal obtains information that a network slice requested by itself from a neighboring cell but not yet provided is provided, the UE checks whether the cell can be selected instead of the current cell (eg, serving cell), when a certain condition is satisfied, the terminal selects the cell. In other words, according to the received network slice information, the UE can confirm that the neighboring cell provides a specific network slice(Example: network slice that has been requested by the terminal for the serving cell, but has not been provided by the serving cell). In this case, the UE checks whether the neighboring cell can be selected as a serving cell instead of a current cell (eg, a serving cell), and may select the neighboring cell when a certain condition is satisfied.

Here, the predetermined condition may be as in the following example. For example, the predetermined condition may be a case in which the signal strength of the cell (neighboring cell) satisfies a predetermined level. For example, the predetermined condition may be a case in which the signal strength of the cell (neighboring cell) is better than that of the current cell (serving cell). For example, the predetermined condition in the above process may be a case in which the cell (neighboring cell) is a cell of a frequency different from the current frequency. Alternatively, the predetermined condition may be a combination of one or more of the three exemplary conditions described above.

In a conventional mobile communication system, when a signal of another cell is stronger than a signal of a current cell (serving cell) at a specific frequency among mobile communication frequencies, the terminal selects another cell. This is because, when the terminal selects another cell using the current frequency used by the serving cell, communication between the terminal and the other cell may become noise for the current serving cell.

Therefore, in the example described above, the operation of the terminal selecting another cell supporting a specific network slice may be restricted to be performed when the terminal selects another cell using a different frequency from the current cell (serving cell), or when the current cell (serving cell) satisfies a predetermined criterion for performing communication with the terminal.

In addition, in the example described above, even if a neighboring cell using a different frequency provides a network slice requested by the terminal but not provided by the current cell (serving cell), the corresponding neighboring cell may not provide the network slice provided by the current cell (serving cell). For example, the terminal wants to use network slice 1 and network slice 2, the serving cell may provide network slice 1, and a neighboring cell may provide network slice 2. In this case, the same operation as the example described above, may be limited to being performed only when a network slice (eg, network slice 2) prioritized over a network slice (eg, network slice 1) provided by the current cell is not yet provided to the UE in the current cell, and the network slice (eg, network slice 2) is provided in another cell or another frequency. For example, the terminal wants to use network slice 1 and network slice 2 having a higher priority than network slice 1, the serving cell may provide network slice 1, and a neighboring cell may provide network slice 2. In this case, when network slice 2 is provided from a neighboring cell or provided at a different frequency, the UE may select a neighboring cell providing network slice 2. Or, when the network provides priority information for each network slice to the terminal, based on the priority information, the UE may perform the cell selection operation described with the example above for a network slice with higher priority (eg, a higher priority). For example, if each user subscribes to a plurality of network slice services, the user may store priority information for each network slice in his/her terminal. Or, based on the subscription information of each terminal, in the process of giving the network slice configuration information to each terminal, the network may inform information on the priority of each network slice. For example, AMF or PCF when delivering the updated configuration information, AMF or PCF may inform information on the priority of the network slice may be additionally to the terminal, through a message such as Configuration Update Command message or Registration accept. The information on the priority of the network slice may be delivered to the user in a state in which it is stored in the USIM of the terminal in advance. Or, there is a network slice configured to keep the UE always available (eg, when the UE is set to always use a specific network slice), the above-described operation may be limited to being performed if this network slice is not provided in the current cell but is available in another cell.

Meanwhile, in a specific situation, continuously performing the above-described operation by the terminal may increase battery consumption of the terminal. For example, the situation shown in the example of FIG. 9 below may be assumed.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 9:
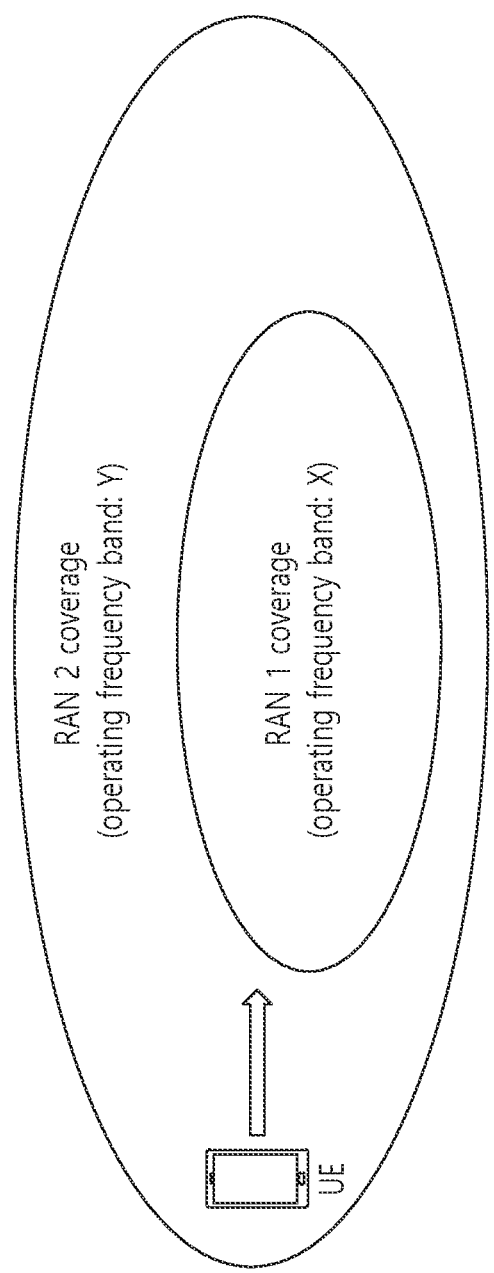
FIG. 9 shows an example of a situation of a terminal according to the disclosure of the present specification.

FIG. 9 Shows an Example of a Situation of a Terminal According to the Disclosure of the Present Specification.

Referring to FIG. 9, a terminal (eg, UE), RAN1 coverage, and RAN2 coverage are shown. RAN1 coverage may be the coverage of cell 1, and cell 1 may use the operating frequency band X. The RAN2 coverage may be the coverage of cell 2, and cell 2 may use the operating frequency band Y.

In the example of FIG. 9, it is assumed that the terminal intends to use a network slice provided only in Band X. In this case, if the UE, as shown in the figure, may move from the maximum boundary of RAN2 coverage (eg, the left edge of RAN 2 coverage) to the RAN1 coverage direction. In this case, as in the example of FIG. 9, in a situation in which the terminal is located outside the coverage of RAN1, for example, if the terminal searches for a frequency (eg, band X) or cell related to the coverage of RAN1, may result in the terminal wasting power unnecessarily.

Accordingly, in the disclosure of the present specification, a cell (eg, C3) using a specific frequency (eg, F3) may transmit network slice information (eg, information related to identification of a network slice) supported by the cell (eg, information related to identification of a network slice) to the terminal. In addition, a cell (eg C3) may transmit information about its neighboring cells (eg cells using the same frequency (eg C4) and/or cells using different frequencies (eg F4) (eg C5)) to the terminal, and may transmit information on cell reselection/selection related thereto to the UE. Here, an example of cell information is as follows. For example, each cell may be identified by the terminal based on center frequency information and a physical cell identifier code (cell id). Each cell may inform the UE of information about neighboring cells (eg, including cell id and frequency information of neighboring cells) through system information. The cell may transmit cell id and frequency information of each cell located adjacent to the terminal through this process. Here, an example of information about cell reselection/selection is as follows. For example, information on cell reselection/selection may include information on whether to move from the current cell to the searched cell when the signal is somewhat better (e.g., information on the difference between the signal of the nearby cell and the signal of the current cell, and/or the quality offset information used for correcting the measured value of the signal, etc.). The UE may continuously measure the quality of the current cell and neighboring cells by using information on cell reselection/selection. Based on information on cell reselection/selection (eg, using quality offset information), the terminal may modify the measured value (the signal measured value of the neighboring cell and/or the signal measured value of the current cell), and the terminal may perform reselection to a neighboring cell, when it is determined that the signal of the neighboring cell is better than the signal of the current cell. Additionally, a cell (eg, C3) transmits network slice information (eg, information about identification of a network slice) supported by these cells (eg, C4 and/or C5) to the UE. Additionally, in order to prevent the UE from unnecessarily selecting cells of different frequencies, the cell (eg, C3) may additionally transmit information about the locations of the neighboring cells (eg, C4 and/or C5) or effective areas of the neighboring cells (eg, C4 and/or C5). Here, the effective area may mean an area in which the UE can actually reselect a cell. For example, the effective area may be expressed using GPS coordinates or the like. The effective area may mean an area in which a signal transmitted by a cell can be received above a certain threshold. The UE may actually reselect the cell when it is located within the effective area of the cell. An extreme example will be used to describe the effective area. For example, if a cell covering a large city such as Seoul transmits information about a neighboring cell, the neighboring cell may be a cell located in Suwon and a cell located in Seongnam. In this case, if the cell only notifies the UE of information on the neighboring cells including the frequency or the cell id, it may not be of practical help to the UEs. That is, even if the terminal is located in Seoul, if the terminal is located near Seongnam or Suwon, information on the neighboring cells may be helpful to the terminal, but otherwise (if the terminal is located far from Seongnam or Suwon), information about neighboring cells may not be very helpful. This is because, even if the terminal receives information about a neighboring cell, it cannot reselect a neighboring cell because it is far from the neighboring cell. Therefore, it can be said that the information on the effective area is used to provide the terminal with information about which area each neighboring cell can access. The UE may perform an operation of selecting a cell based on the above-described information (eg, network slice information of C3, information on neighboring cells, information on cell reselection/selection, network slice information on neighboring cells, and/or information on the location or effective area of neighboring cells). For example, the UE may perform an operation of searching for a neighboring cell, monitoring a signal of a neighboring cell, or considering the neighboring cell as a cell reselection candidate, based on the above-described information. In this case, if the UE wants to use the network slice supported by the neighboring cell (eg, C4), the UE may perform the operation of selecting a corresponding neighboring cell only when the location of the terminal is within the effective area of the neighboring cell, based on the information on the location or effective area of the neighboring cell (eg, C4) and the network slice information of the neighboring cell (eg, C4).

In the examples of operation of the terminal and/or network described above, although the disclosure of the present specification has described an example in which an operation related to a network slice is performed based on a cell, this is only an example, an operation related to a network slice may be performed in units of TAs. For example, the UE may know whether a network slice is available/unavailable for each TA. A network or a network operator may bundle a plurality of cells and manage them in units of TAs. For example, the network or network operator may allocate TA1 to all cells located in region A and TA2 to all cells located in region B. In this case, the operator may configure to provide the same network slice to cells in the same TA. In this case, even though all cells within the same TA provide the same network slice, if each cell transmits network slice information supported by it, radio resources may not be used efficiently. Therefore, in this case, the network may transmit information on whether a network slice is available or not available to the terminal in units of TAs, the network may transmit the network slice information of the available TA to the UE. Accordingly, the UE may perform the above-described operations for cells of TAs different from the TA of the current cell (serving cell). In order to support operations related to network slices performed in units of TAs, when the network or each cell transmits information on neighboring cells, the network or each cell may transmit information on a TA to which the neighboring cell belongs, information on cells included in each TA, and information on a network slice provided by each TA. When the UE has not provided with the desired network slice in the cell (eg, serving cell) to which the UE currently belongs, and when there is a cell of a TA different from the current cell in the vicinity of the terminal, and a desired network slice is available in this TA, the UE may perform reselection with the cell to which this TA belongs. A network or cell may also transmit information on a network slice available in a neighboring TA to the UE, the UE may perform a combination of the above-described operations based on information on network slices available in neighboring TAs.

Alternatively, in the state of the terminal described with reference to FIG. 9, in order to effectively control the terminal searching for the frequency of RAN1, the network may provide the terminal with a reference value used for searching for a frequency of RAN1. For example, after the terminal receives this reference value, when the terminal itself measures the signal of the cell in RAN2or the signal of the cells of the current frequency (the frequency currently used by the terminal) is higher or lower than this reference value, the UE may start searching for a frequency corresponding to RAN1. For example, the UE performs measurement on a cell in RAN2 where it is currently located or cells of the current frequency (frequency currently used by the UE) (eg, measures the signal strength of a cell in RAN2 or cells of the current frequency), when this measured value is greater than or equal to the reference value (eg, when the terminal moves from the edge of RAN 2 coverage to the center of RAN2 coverage and RAN 1 coverage, as in the example of FIG. 9, the measured value increases), the UE may additionally start to measure other nearby frequencies (eg, the frequency of RAN2) or other cells. The above-described reference value or other parameters such as frequency may be transmitted to the UE through cells of RAN2. And, this operation is performed when the network slice desired by the terminal is not provided in the current cell, and when a corresponding network slice is provided in a neighboring cell, TA, or another frequency (eg, a frequency different from the frequency currently used by the UE), alternatively, when information related thereto (eg, network slice information of a neighboring cell) is received from the network. For example, the UE may know that a desired network slice is provided in the vicinity by directly performing a scan or the like. As another example, when the terminal does not directly perform a scan, etc, the UE may receive network slice information available in the vicinity through the SIB transmitted by the current cell.

The operations performed by the terminal described above through various examples are not always performed by the terminal, whether the terminal starts the corresponding operation may be controlled by the instruction of the network. For example, after the terminal transmits a message requesting network slices A and B to the core network (eg, AMF), the network may inform the UE that only the network slice A is provided by the network. In this case, the network may transmit information indicating that the operation is permitted or disallowed to the terminal(eg, for network slice B which was requested by the terminal, cell or core network may transmit information indicating that the operation(e.g., operations described through various examples above) for the terminal to reselect a cell providing network slice B is permitted or disallowed to the terminal). For example, in the registration procedure, the terminal may receive information indicating that the operation for reselection is permitted or disallowed directly from the core network. Alternatively, since the reselection process is a process of reselecting a cell in the radio end, through the SIB of each cell, the terminal may receive information indicating that the operation for reselection for network slice is permitted or disallowed. The terminal may perform the above-described operations only when receiving the information indicating permission. Alternatively, the network may transmit information on the location, frequency, TA, and/or PLMN of an area in which the service of network slice B can be provided to the terminal. The UE may efficiently select another cell/frequency/TA/PLMN based on such information.

Here, information on which network slice is available in the neighboring cell/TA/frequency/PLMN is created in core network nodes such as PCF, NSSF, UDM, and or AMF, and is individually transmitted to the terminal in via AMF, alternatively, the information may be transmitted to the UE through an SIB or the like in each cell. For example, when the cell transmits information on whether a network slice is available in a neighboring cell/TA/frequency/PLMN to the terminal through SIB, etc., security issues may arise. To maintain information security (Example: in order to prevent network slice information from being leaked, and to prevent a terminal of another operator or an unauthorized terminal receives information about which network slice is available in a neighboring cell/TA/frequency/PLMN), the network may transmit a pseudo identifier for each network slice to the UE. In other words, when the network transmits information related to the network slice to the terminal, the network may transmit a pseudo identifier for each network slice. The pseudo identifier for the network slice is may be information informing the network of which value to transmit information on the permitted network slice to the terminal, in the process of the terminal performing the registration procedure, or in the process of managing the RRC connection. The network may transmit a pseudo identifier for each network slice to the terminal using a previously agreed encryption method. Alternatively, the network may periodically change the pseudo identifier for each network slice and transmit it to the terminal. The UE may receive the pseudo code of the network slice in each cell and/or neighboring cells transmitted by each cell. Then, the terminal can determine information about the network slice indicated by the pseudo code of the network slice with respect to the received information (eg, a pseudo identifier for each network slice). In particular, when encryption is applied to the pseudo code, the network slice referred to by the pseudo code of the network slice can be identified by decrypting the encryption. For example, The UE may determine information on the network slice indicated by the pseudo code, based on a preset decryption method, an encryption decryption method agreed in advance with the network, or an encryption decryption method received from the network. The UE may identify whether the identified network slice is a network slice that provides a desired service or not. The UE may perform an operation related to the network slice described above based on the identified network slice.

In the operation of the terminal and/or network described above, after the terminal requests a desired network slice, if the network or cell does not provide that network slice, the network or cell may inform the UE of the slice search period timer value. The slice search period timer value may be used by the UE to search for another frequency/TA/cell supporting a network slice desired by the UE. For example, according to the various examples described above, the terminal does not receive the desired network slice in the current cell, the terminal receives information from the network that the corresponding network slice is provided through another frequency/TA/cell, or the terminal may be instructed from the network of such information. In this case, the terminal searches for other frequencies/TAs/cells in the vicinity and finds a cell providing a network slice related to the service it wants, by reselecting the corresponding cell, the terminal may perform the network slice request again in the corresponding cell. On the other hand, the terminal searched for other frequencies/TA/cells, and if there are no cells that can be reselected, the terminal may start a timer according to the timer value (eg, slice search period timer value). And, when this timer value expires, the terminal starts searching for other frequencies/TAs/cells in the vicinity again, the terminal may search whether there is a cell providing a desired network slice. If there is a cell providing the corresponding network slice, the terminal may reselect the corresponding cell. When there is no cell providing the corresponding network slice, the terminal may start the timer again according to the timer value.

Here, the process of the UE searching for neighboring cells again can be triggered according to several criteria indicated by the network, for example, it is triggered when a change in the measured quality of the current cell that occurs during a certain time satisfies the criteria indicated by the network, the UE may perform a process of re-searching for neighboring cells. In the above process, each time the terminal performs the cell reselection process, the timer may be started again In addition, even if the signal quality of the current cell (eg, serving cell) is sufficient, the UE may perform a process of searching for neighboring cells. The operation for the UE to search for a neighboring cell may be performed when some network slices among the network slices requested by the UE are not provided by the current cell.

In the contents described above through various examples, network slice information may be processed while performing a registration procedure in the NAS (NAS layer of the terminal). The NAS may know whether the current cell provides a network slice desired by the UE based on the network slice information.

In the contents described above through various examples, the NAS entity (eg, NAS layer) and the RRC entity (eg, RRC layer) of the terminal may perform the following operations. For example, the NAS entity of the terminal may request a network slice from which the terminal wants to be provided in the registration process. Among the network slices requested by the NAS entity of the terminal, there may be a case where the terminal receives a rejection message from the network, if there is a network slice that is not provided by the network, or the network cannot provide a high-priority network slice. In these cases, the NAS layer may deliver information on the network slice for which the terminal desires a service to the RRC layer. Then, in the process of searching for a network or cell, the RRC layer, based on information received from the network or cell, may check whether a network slice desired by a higher layer (eg, a NAS layer and/or an application layer) is available in a neighboring cell/frequency/TA, etc. And, the RRC layer performs a measurement process according to the inspection result, when the criteria (e.g., criteria used in the examples described above, such as a reference value related to a signal of a neighboring cell/serving cell, availability information of a network slice, priority of a network slice, location information of a neighboring cell, etc.) are satisfied, the RRC layer may camp on a cell that satisfies the criteria, or the RRC layer may notify the upper end (eg, NAS layer) that a network slice is available.

Hereinafter, specific examples of the information transmitted by the network to the terminal and the information transmitted by the terminal to the network described in various examples above will be described.

For example, information transmitted by the network may be included in the SIB1 message and transmitted to the terminal.

SIB1 may include information related to when evaluating whether the UE is allowed to access the cell. SIB1 may define scheduling of other system information. SIB1 may include radio resource configuration information common to all UEs and barring information applicable to integrated access control. SIB1 may be transmitted from the network to the UE. An example of Table 3 below is an example of a SIB1 message according to an embodiment of the disclosure of the present specification.

TBALE 3

-- ASN1START
-- TAG-SIB1-START
SIB1 := SEQUENCE {
cellSelectioninfo SEQUENCE: {
q-QualSliceOffset INTEGER (1..8) OPTIONAL
}
OPTIONAL,
   networkSliceInfo       NetworkSliceinfo,
}
-- TAG-SIB1-STOP
-- ASN1STOP For reference, in the example of Table 3, the SIB1 message includes new information proposed according to the disclosure of the present specification, but this is only an example, and the SIB1 message may further include various pieces of information according to the prior art (eg, q-RxLevMin, si-SchedulingInfo, etc.). According to the example of Table 3, the SIB1 message may include cellSelectionInfo and networkSliceInfo. And, cellSelectionInfo may include q-QualSliceOffset.

cellSelectionInfo may mean a parameter for cell selection related to a serving cell.

q-QualSliceOffset may mean an offset used when the UE searches for another cell related to a network slice. q-QualSliceOffset may be used to control when the UE should search for another cell. q-QualSliceOffset may include an offset value that is an integer (eg, an integer of 1 to 8). q-QualSliceOffset may be allocated for each network slice. For example. q-QualSliceOffset may be transmitted to the UE together with the identifier of the network slice.

networkSliceInfo may indicate information on a network slice supported by a cell (cell transmitting SIB1). networkSliceInfo may include a network slice identifier. The network slice identifier may be ciphered or pseudonymized. The UE may identify, based on networkSliceInfo, which cell an upper layer (eg, NAS layer) supports a desired network cell. For reference, the NAS layer may perform interaction with the application layer. The RRC layer can indirectly interact with the application through the NAS layer.

As another example, information transmitted by the network may be included in the SIB4 message and transmitted to the terminal.

SIB4 may include information related only to inter-frequency cell re-selection. For example, the SIB4 message may include information on other NR frequencies related to cell re-selection and information on inter-frequency neighboring cells. This Information Element (IE) (ie, SIB 4) may include commonly used cell reselection parameters and cell specific reselection parameters for frequency. SIB4 may be transmitted from the network to the UE. An example of Table 4 below is an example of a SIB4 message according to an embodiment of the disclosure of the present specification.

TABLE 4

-- ASM START
-- TAG-SIB4-START
SIB4 := SEQUENCE {
interFreqCarrierFreqListInterFreqCarrierFreqList,
InterFreqCarrierFreqList ::= SEQUENCE (SIZE (1..maxFreq)) OF
InterFreqCarrierFreqInfo
InterFreqCarrierFreqInfo ::= SEQUENCE {
interFreqSliceList InterFreqSliceList OPTIONAL,
threshX-Slice ReselectionThreshold,
intervalSearchSlice IntervalSearchSlice,
....
}
-- TAG-SIB4-STOP
-- ASN1STOP For reference, in the example of Table 4, the SIB4 message includes new information proposed according to the disclosure of the present specification, but this is only an example, and the SIB4 message may further include various pieces of information according to the prior art (eg, lateNonCriticalExtension, nrofSS-BlocksToAverage, etc.).

According to the example of Table 4, the SIB4 message may include interFreqCarrierFreqList. And, interFreqCarrierFreqList may include InterFreqCarrierFreqInfo. InterFreqCarrierFreqInfo may include interFreqSliceList, threshX-Slice, and intervalSearchSlice. threshX-Slice may include ReselectionThreshold.

The interFreqCarrierFreqList may include neighbor carrier frequencies information and frequency specific cell re-selection information. InterFreqCarrierFreqInfo means specific information included in interFreqCarrierFreqList, and may include neighbor carrier frequencies information and frequency specific cell re-selection information.

interFreqSliceList may mean a list of network slices available at a specific frequency (eg, Frequency X). The interFreqSliceList may be provided for each cell. For example, the interFreqSliceList may be sent to the UE in combination with the cell's identifier. The interFreqSliceList may also be provided for an intra-frequency cell.

threshX-Slice may mean a threshold value used to determine when to start measurement for a specific frequency (eg, Frequency X). For example, threshX-Slice may be used by the UE to determine when to start a measurement on a specific frequency (eg Frequency X) or to determine the UE can move to a cell existing on that frequency, in order to search for a cell the UE, when the UE knows that the network slice it wants to access is supported on a specific frequency (eg Frequency X).

intervalSearchSlice may mean an interval for periodically searching for the existence of a network slice (eg, a network slice that the UE intends to use but does not yet have access to by the UE).

Meanwhile, information transmitted by the terminal may be included in the RRC-related message and transmitted to the network. For example, the UE may transmit information on a network slice to be provided to the network by including it in an RRC-related message.

For example, information transmitted by the terminal may be included in the RRCSetupComplete message and transmitted to the network. For reference, the RRCSetupComplete message may be transmitted while the UE performs a procedure for establishing an RRC connection to the network. For example, the terminal may transmit the RRCSetupRequest message to the network and then receive the RRCSetup message from the network. After receiving the RRCSetup message, the UE may transmit an RRCSetupComplete message to the network. An example of Table 5 below is an example of an RRCSetupComplete message according to an embodiment of the disclosure of the present specification.

TABLE 5

```
-- ASN1START
-- TAG-RRCSETUPCOMPLETE-START
RRCSetupComplete ::= SEQUENCE {
rrcSetupComplete RRCSetupComplete-IEs
....
}
RRCSetupComplete-IEs ::= SEQUENCE {
requiredSlices RequiredSlices
....}
```

The RRCSetupComplete message may include rrcSetupComplete. rrcSetupComplete may include information elements (IEs) related to RRCSetupComplete (eg, RRCSetupComplete-IEs). RRCSetupComplete-IEs may include requiredSlices. requiredSlices may include a list of network slices for which an upper layer (eg, a NAS layer and/or an application layer) wants to receive a service. In the contents described above through various examples, respective values and/or information may be transmitted for each network slice. In the above description through various examples, the name or message of the name or value of the information is merely an example, and the scope of the present specification includes the transmission of the name of the name or the name of the other value as described above. In addition, the information or values described above may be transmitted while being included in other messages (eg, messages other than SIB1 messages, messages other than SIB4 messages, messages other than RRCSetupComplete, etc.) other than the messages described above.

For reference, the following contents may be applied to the operation of the terminal and/or the operation of the network described above through various examples. When the terminal needs access to a plurality of network slices, information on a network slice to be accessed (or selected) preferentially from among the plurality of network slices may be transmitted from the application layer of the terminal to the NAS layer. Alternatively, the network may transmit information on a network slice to should be preferentially accessed (or selected) from among a plurality of network slices to the terminal.

In addition, the following contents may be applied to the operation of the terminal and/or the operation of the network described above through various examples. When a new application is started in an upper layer (eg, application layer) of the terminal, or when an upper layer (eg, application layer) of the terminal requests access to a new network slice, the operation of the terminal and/or the operation of the network as described above may be performed.

Hereinafter, an example of an operation of a terminal and/or an operation of a network according to the disclosure of the present specification will be described with reference to FIGS. 10 to 12. For reference, even if the operation of the network or the operation of the terminal not shown in FIGS. 10 to 12, the operation of the terminal and/or the operation of the network described above through various examples may be performed.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
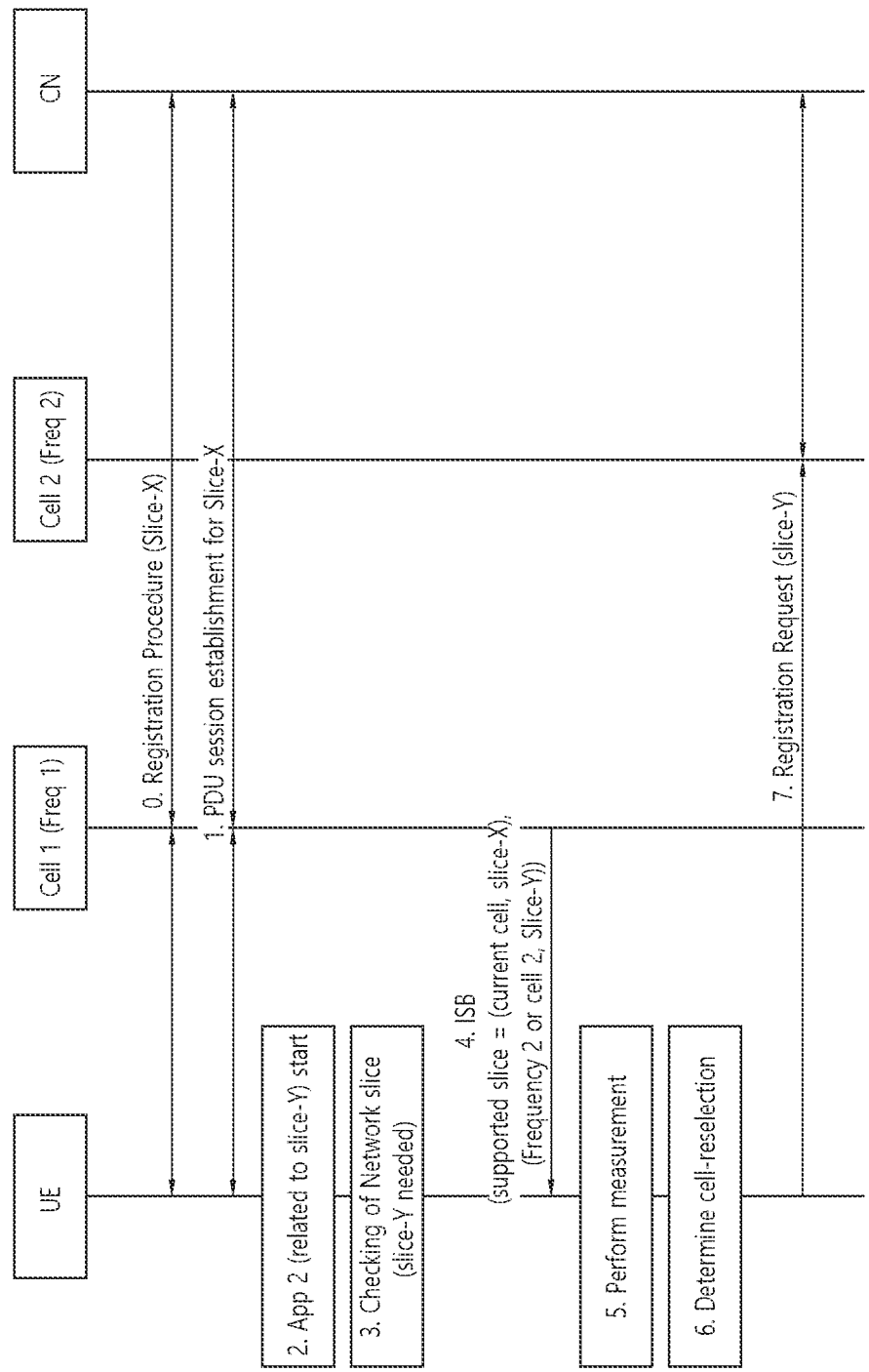
FIG. 10 shows an example of operation of a network and/or a terminal according to the disclosure of the present specification.

FIG. 10 Shows an Example of Operation of a Network and/or a Terminal According to the Disclosure of the Present Specification.

Referring to FIG. 10, a UE, Cell 1 (using Frequency 1), Cell 2 (using Frequency 2), and a CN (Core Network) are shown. In the example of FIG. 10, Cell 2 is illustrated as using a different frequency from Cell 1, but this is only an example, and Cell 2 uses the same frequency as Cell 1, but may be a cell providing a different network slice.

Cell 1 may be a cell providing a network slice X (slice-X). Cell 2 may be a cell providing a network slice Y (slice-Y).

0) When the terminal is powered on (eg, when the terminal is powered on), the terminal may determine the network slice to which it should access. In addition, the UE may perform a registration procedure for a network slice to which the UE is to access. In the example of FIG. 10, it is assumed that the terminal needs access to a network slice X (slice-X). For example, the application layer of the terminal executes application 1 (App 1), and application 1 may be an application using the network slice X. The terminal may determine that access to network slice X (slice-X) is necessary due to the execution of application 1. For example, the UE may perform a registration procedure by transmitting a registration request message including information related to a network slice (eg, network slice X) to which it wants to access to the CN through cell 1.

1) After the registration procedure is performed, the UE may perform a PDU session establishment procedure through an allowed network slice (eg, network slice X). For example, the UE may perform the PDU session establishment procedure by transmitting the PDU session establishment procedure including the NSSAI of the network slice X to the CN through cell 1. The UE may transmit and receive data through the generated PDU session (eg, a PDU session related to network slice X).

2) A situation may arise in which the UE wants to use a network slice (eg, slice-Y) different from the previously used network slice (eg, slice-X). For example, application 2 (app 2) installed in the terminal may be started, or data may be generated in application 2 (app 2). Step 2) shown in FIG. 10 is only an example, and there may be a situation in which the terminal wants to use the network slice Y due to other causes.

3) The terminal may determine which network slice is to be transmitted data generated in application 2. For example, the terminal may determine that data generated in application 2 should be transmitted through the network slice Y. Configuration information about which application data is transmitted through which network slice may be stored in the terminal in the form of, for example, a user route selection policy (URSP), etc. For example, the terminal may know that the network slice related to the data generated in the application 2 is the network slice Y based on information such as URSP, etc. The UE can confirm that it is currently connected only to the network slice X. That is, the terminal should access the network slice Y, but can confirm that it is currently connected only to the network slice X.

4) Cell 1 may transmit an SIB message to the UE. The SIB message may include network slice information of cell 1 and network slice information of a neighboring cell (eg, cell 2). For reference, the operation of cell 1 transmitting the SIB message to the UE is illustrated as being performed between steps 3) and 5) in the example of FIG. 10, but this is only an example. Cell 1 may transmit an SIB message to the UE at any time. For example, cell 1 may transmit an SIB message to the UE before step 0) is performed. The UE may determine whether the current cell can provide the network slice Y, based on the SIB information (eg, information included in the SIB message) received from the current cell (ie, the serving cell of the current UE) (cell 1). In the example of FIG. 10, according to the SIB received by the terminal from the network, the terminal may confirm that slice X is provided in the current cell, and slice Y can be provided in a neighboring cell (eg, cell 2 using freq 2). Therefore, the terminal can confirm that it can be provided with the slice Y only when it moves to cell 2. That is, since the current serving cell (eg, cell 1) does not provide the network slice Y, the UE may confirm that the UE must be connected to (or have access to) the cell 2 in order to use the network slice Y. For reference, the network may transmit a correction value (eg, offset) for each network slice. Here, the correction value (eg, offset) may mean an offset applied to the cell and/or frequency measurement value performed in step 5). The correction value for each network slice may be transmitted while being included in the network slice information transmitted by the cell. For example, cell 1 may transmit network slice information of cell 1 (eg, including information and correction values related to network slice X) and network slice information of a neighboring cell (eg, cell 2) (eg, including information related to network slice provided by the neighboring cell, and a correction value of the corresponding network slice) to the terminal.

5) The UE may perform a measurement process for a neighboring cell and/or frequency. For example, the UE may measure RSRP and/or RSRQ of a neighboring cell and/or frequency.

6) The UE may determine whether to perform cell reselection, and may perform cell reselection according to the determination. For example, as it is determined that the terminal should use the network slice Y in step 3), the UE may identify that the cell or frequency (eg, the cell or frequency related to network slice Y) to which it should preferentially move (connection or access) is cell 2 or frequency 2. Based on the result measured in step 5) and that the cell or frequency (eg, cell or frequency related to network slice Y) to which the terminal should preferentially move (connection or access) is cell 2 or frequency 2, when a certain condition is satisfied, the terminal can move to a corresponding cell or frequency. When a certain condition is satisfied, the terminal determines to reselect cell 2 or frequency 2, and performs an operation for connecting (or accessing) to cell 2 or frequency 2, thereby performing cell reselection. For example, the network transmits a correction value (eg, offset) to the terminal for each network slice, the UE may determine to reselect cell 2 or frequency 2 when a certain condition is satisfied using a correction value (eg, offset).

For example, the terminal may apply a correction value for each network slice received from the network to a value measured for a signal of a current cell and/or a value measured for a signal from a neighboring cell. After applying the correction value, the terminal compares the measured value of the signal of the current cell with the measured value of the signal of the neighboring cell, and if the measured value of the signal of the neighboring cell is greater than the measured value of the signal of the current cell, by selecting a neighboring cell, the terminal may use network slice Y. Specific examples are as follows:

The network may transmit a correction value to the UE for each network slice. It is assumed that a quality value (eg, a measurement value based on RSRP or RSRQ, etc.) at which the UE measures the signal of the current cell (Cell 1) is 20, and the quality value at which the UE measures the signal of a neighboring cell (eg, Cell 2) (eg: a measurement value based on RSRP or RSRQ) is 15. That is, it is assumed that the quality of Cell 2 is lower than the quality of the current cell. For reference, the unit of the quality value measured here and the unit of the offset may be dB or dBm.

In this case, the terminal may apply the correction value (eg, offset) for the network slice Y (or frequency 2 or Cell 2) indicated by the network (ie, transmitted to the terminal by the network) to the quality value measured of the signal of the neighboring cell.

a) When the correction value (eg, offset) for the network slice Y (or frequency 2 or Cell 2) indicated by the network (ie, transmitted to the terminal by the network) is 4, the following operation may be performed. The UE may determine the corrected measured quality of cell 2 as 19 by adding 4 to the quality value 15 of the neighboring cell. The corrected measured quality of cell 2 is 19, and since it is still lower than the quality value of the current cell (20), the terminal does not reselect the cell.

b) When the correction value (eg, offset) for the network slice Y (or frequency 2 or Cell 2) indicated by the network (ie, transmitted to the terminal by the network) is 6, the following operation may be performed. The UE may determine the corrected measured quality of cell 2 as 21 by adding 6 to the quality value 15 of the neighboring cell. The corrected measured quality of cell 2 is 21, and since it is higher than the quality value (20) of the current cell, the terminal may reselect cell 2.

For reference, in step 6), the operation of the terminal applying a correction value (eg, offset) is, may be performed only when the target (ie, the neighboring cell/frequency/network slice to which the terminal applies the correction value) provides the network slice that the terminal wants to use. For example, in the process of steps 2) and 3), if app2 using network slice Y is not running, or if network slice Y is not needed for some other reason, the UE may not perform an operation of applying a correction value (eg, offset). For reference, the correction value (eg, offset) may be transmitted to the terminal in the form of q-QualSliceOffset in the example of Table 3.

7) According to the result of step 6), the UE may perform an operation of reselecting to a new cell (eg, cell 2) supporting network slice Y. In this case, the terminal may perform a registration procedure so that the network slice Y can be provided. The UE may transmit a registration request message to the core network via cell 2. The registration request message may include an identifier (eg, NSSAI) of network slice Y.

Hereinafter, with reference to FIG. 11, an example of the operation of the terminal described above through various examples will be described. For reference, the operation of the terminal described with reference to FIG. 11 is merely an example, and the terminal may perform the operations described through various examples in addition to the operation illustrated in FIG. 11.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
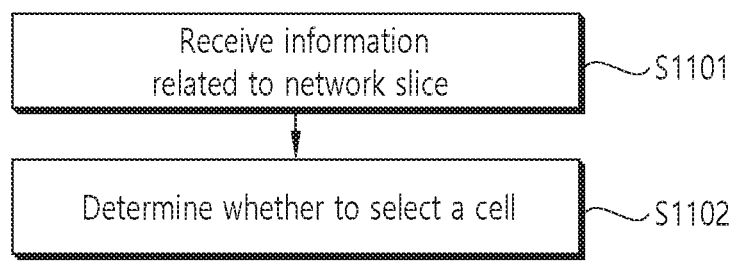
FIG. 11 shows an example of operation of a network and/or a terminal according to the disclosure of the present specification.

FIG. 11 Shows an Example of Operation of a Network and/or a Terminal According to the Disclosure of the Present Specification.

In step SA301, the terminal may receive information related to the network slice. For example, the terminal may receive information on a network slice that the current cell can provide and/or information on a network slice that a neighboring cell can provide from the current cell (serving cell). Here, the information related to the network slice may be provided to the UE for each frequency, TA unit, or cell. In addition, the information related to the network slice transmitted by the current cell may include information related to the location (or effective area) of the neighboring cell. When the terminal is located within the effective area of the neighboring cell, the terminal may perform an operation such as searching for a neighboring cell or monitoring a signal of a neighboring cell, based on information related to the location (or effective area) of the neighboring cell. In addition, the network may provide a reference value used for searching for signals of neighboring cells, in order to effectively control that the terminal to search for a neighboring cell (or a frequency of the neighboring cell). For example, based on this reference value, the terminal may start searching for a frequency corresponding to the neighboring cell when the measured value of the signal of the neighboring cell is higher or lower than the reference value. For reference, the network may transmit a correction value (eg, offset) to the UE for each network slice.

In step SA302, the terminal may determine whether to select a cell. For example, the UE may determine whether to select a cell based on information related to the network slice. As an example, when the network slice that the UE intends to use is not provided in the current cell but is provided in a neighboring cell, the UE may determine to select a neighboring cell. Then, the UE may perform a cell reselection procedure for selecting a neighboring cell. The UE may transmit a message (eg, a registration request message) including network slice information that the UE intends to receive service to the core network through the neighboring cell.

For reference, the network slice that the terminal intends to use may be a network slice required because an application installed in the terminal is started or data is generated in the application.

As described in the example of step 6) of FIG. 10, the UE may determine whether to select a neighboring cell by applying a correction value (eg, an offset) to a value measured for a signal of a neighboring cell.

Hereinafter, an example of the operation of the network described above through various examples will be described with reference to FIG. 12. For reference, the operation of the network described with reference to FIG. 12 is only an example, and the network may perform the operations described through various examples in addition to the operation illustrated in FIG. 12.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
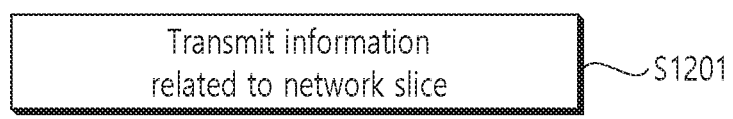
FIG. 12 shows an example of operation of a network and/or a terminal according to the disclosure of the present specification.

FIG. 12 shows an example of operation of a network and/or a terminal according to the disclosure of the present specification.

In step SA401, a network (eg, a cell) may transmit information related to a network slice. Here, the information related to the network slice may be transmitted in the same manner as in the example of Table 3 or the example of Table 4. For example, a network (eg, a cell) may transmit information about a network slice that it can provide and/or information about a network slice that a neighboring cell can provide. A network (eg, cell) may transmit information related to a network slice for each frequency, TA unit, or cell. In addition, the network (eg, cell) may also transmit information related to the location (or effective area) of a neighboring cell. In addition, in order to effectively control the UE to search for neighboring cells (or frequencies of neighboring cells), the network (eg, cell) may transmit a reference value used for searching for signals of neighboring cells to the terminal. The network (eg, cell) may transmit a correction value (eg, offset) to the UE for each network slice.

According to the disclosure of the present specification, in a mobile communication system, it is possible to effectively manage the mobility of the terminal. For example, it is possible to maximize the available time during which the terminal can access a network slice desired to be provided. In addition, it is possible to prevent the UE from wasting power unnecessarily by searching for a frequency or a cell based on information related to a network slice received by the UE from the network.

For reference, the operation of the terminal and the operation of the network through various examples have been described above focusing on the cell reselection process. However, this is merely an example, and the scope of the disclosure of the present specification is not limited thereto. For example, in a process in which the terminal performs cell selection, the operation of the terminal and the operation of the network through various examples above may be applied. For example, that is, the NAS entity (NAS layer) of the terminal may request information about network slices available in the vicinity (eg, neighboring cells, etc.) from the RRC layer before performing the registration procedure. In this case, the RRC entity (RRC layer) of the terminal searches for a signal including cells around itself, the same frequency as the currently used frequency, and a different frequency, and may receive information on the network slice supported by each cell (eg, network slice information included in the SIB message transmitted by the cell). The RRC entity (RRC layer) of the terminal may deliver information on the acquired network slices to the NAS entity (NAS layer) of the terminal. In this process, the RRC entity (RRC layer) of the terminal may report to the NAS entity (NAS layer) of the terminal only network slice information of cells in which signals of a certain signal quality or higher are measured. The NAS entity (NAS layer) of the terminal may search for a network slice to which the terminal wants to receive a service, based on the information about the network slice received from the RRC entity (RRC layer) of the terminal. And, the NAS entity (NAS layer) of the terminal selects a specific cell of a specific frequency that provides a network slice to which it wants to receive a service, the NAS entity (NAS layer) may deliver information on a specific cell to the RRC entity. The RRC entity (RRC layer) of the terminal may select a cell based on information of the NAS entity (NAS layer) of the terminal, and camp on to the corresponding cell.

In addition, in the various examples described above, when the NAS layer of the terminal transmits a connection request message (eg, a registration request message, etc.) to the network, the NAS layer of the terminal may also deliver information on the network slice requested by the terminal to the RRC layer. The RRC layer of the UE may additionally include information on the network slice requested by the UE in a message such as RRC setup complete and transmit it to the network (eg, refer to the example of Table 5).

For reference, in the above-described various examples, information (eg, information on network slices supported by neighboring cells/frequency) transmitted by the network may be transmitted to the terminal by being included in messages such as an RRC connection release message and an RRC connection reject message The operation of the terminal and the operation of the network described in the disclosure of the present specification are applicable to various mobile communication systems such as EPS and 5GS. The name of a message or entity name used in the operation of the terminal and the operation of the network described in the disclosure of this specification may be adjusted to correspond to the name of the message or the name of the entity used in various mobile communication systems.

As described in the disclosure of this specification, the terminal may transmit a network slice service request. The UE may check the network slice in which the service is provided. The UE may receive information on a network slice provided from a neighboring cell. When a network slice required by the terminal is not provided in the current cell, when the terminal finds a network slice to be provided by the terminal, an operation of selecting a cell supporting the corresponding network slice may be performed. For example, the UE may move to a cell supporting the corresponding network slice and perform a registration update process (eg, a registration procedure for cell reselection, etc.).

For reference, the operation of the terminal (eg, UE) described in this specification may be implemented by the apparatus of FIGS. 13 to 17 to be described below. For example, the terminal (eg, UE) may be the first device 100a or the second device 100b of FIG. 14. For example, an operation of a terminal (eg, UE) described herein may be processed by one or more processors 1020a or 1020b. The operation of the terminal described in this specification may be stored in one or more memories 1010a or 1010b in the form of an instruction/program (e.g. instruction, executable code) executable by one or more processors 1020a or 1020b. One or more processors 1020a or 1020b control one or more memories 1010a or 1010b and one or more transceivers 1031a or 1031b, and execute instructions/programs stored in one or more memories 1010a or 1010b as disclosed herein, thereby perform the operation of the terminal (eg, UE) described in the disclosure of the present specification.

In addition, instructions for performing an operation of a terminal (eg, a UE) described in the disclosure of the present specification may be stored in a non-volatile computer-readable storage medium in which it is recorded. The storage medium may be included in one or more memories 1010a or 1010b. And, the instructions recorded in the storage medium may be executed by one or more processors 1020a or 1020b to perform the operation of the terminal (eg, a UE) described in the disclosure of the present specification.

For reference, the operation of a network node (eg, AMF, SMF, UPF, PCF, etc.) or a base station (eg, NG-RAN, gNB, gNB(NB-IoT), gNB(NR) eNB, RAN, etc.) described in this specification will be may be implemented by the apparatus described below in FIG. 13 to 20. For example, the network node (eg, AMF, SMF, UPF, PCF, etc.) or a base station (eg, NG-RAN, gNB, gNB(NB-IoT), gNB(NR) eNB, RAN, etc.) may be the first device 100a or the second device 100b of FIG. 14. For example, the operation of the network node (eg, AMF, SMF, UPF, PCF, etc) described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and may perform the operation of the network node (eg, AMF, SMF, UPF, PCF, etc.) or the base station (eg, NG-RAN, gNB, gNB(NB-IoT), gNB(NR) eNB, RAN, etc.) described in the disclosure of the present specification by executing instructions/programs stored in one or more memories 1010a or 1010b as disclosed herein.

In addition, the instructions for performing the operation of the network nodes described in the disclosure of this specification (eg, AMF, SMF, UPF, PCF, etc.) or a base station (eg, NG-RAN, gNB, gNB(NB-IoT), gNB(NR) eNB, RAN, etc.) may be stored in a non-volatile computer-readable storage medium recording. The storage medium may be included in one or more memories 1010a or 1010b. And, the instructions recorded in the storage medium are executed by one or more processors 1020a or 1020b to perform operations of the network node (eg, AMF, SMF, UPF, PCF, etc.) or base station (eg, NG-RAN, gNB, gNB (NB-IoT), gNB(NR) eNB, RAN, etc.) described in the disclosure of the present specification.

III. Examples to which the Disclosure of the Present Specification Applies

Although not limited thereto, the various descriptions, functions, procedures, suggestions, methods, and/or operational flowcharts of the disclosure of the present specification disclosed in this document may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 13:
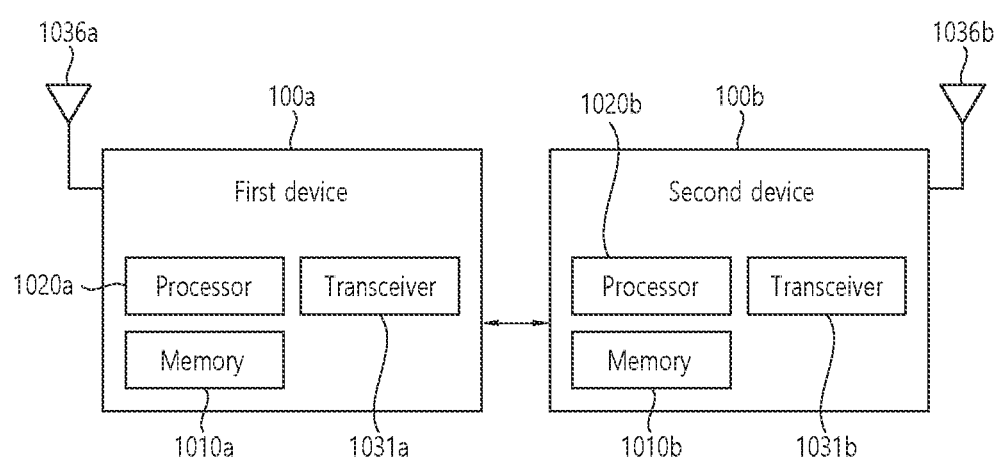
FIG. 13 illustrates a wireless communication system according to an embodiment.

FIG. 13 Illustrates a Wireless Communication System According to an Embodiment.

Referring to FIG. 13, the wireless communication system may include a first device 100a and a second device 100b. The first device 100a and the second device 100b may be wireless communication devices capable of performing wireless communication.

The first device 100a may be a UE described in the disclosure of the present specification. Or, the first device 100a may be a base station, a network node(e.g. SMF #1, AMF #1, UPF #1, SMF #2, AMF #2, UPF #2, MME #1, SGW #1, PGW #1, MME #2, SGW #2, PGW #2, etc), a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node(e.g. SMF #1, AMF #1, UPF #1, SMF #2, AMF #2, UPF #2, MME #1, SGW #1, PGW #1, MME #2, SGW #2, PGW #2, etc) described in the disclosure of the present specification. Or, the second device 100b may be a base station, a network node, a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the objector background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 14:
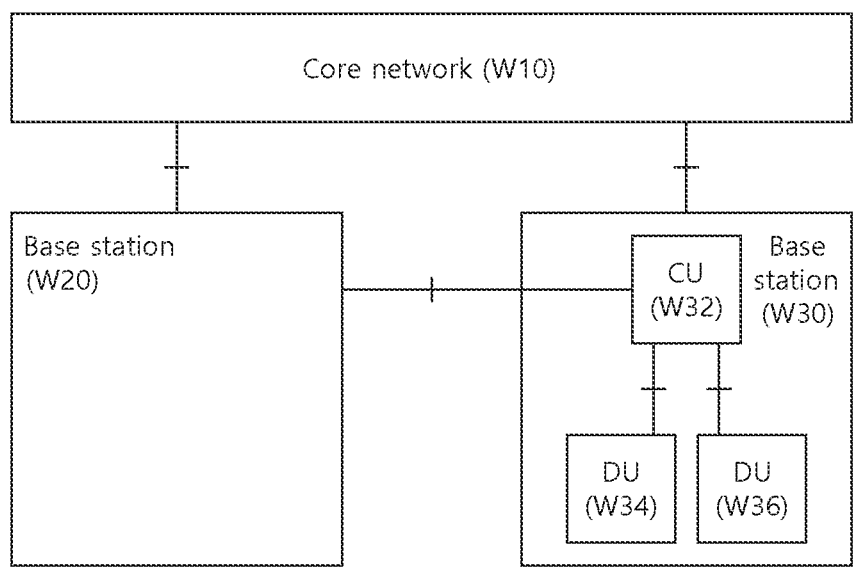
FIG. 14 illustrates a block diagram of a network node according to an embodiment.

FIG. 14 Illustrates a Block Diagram of a Network Node According to an Embodiment.

In particular, FIG. 14 is a diagram illustrating in detail a case in which a base station is divided into a Central Unit (CU) and a Distributed Unit (DU).

Referring to FIG. 14, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1 . The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 15:
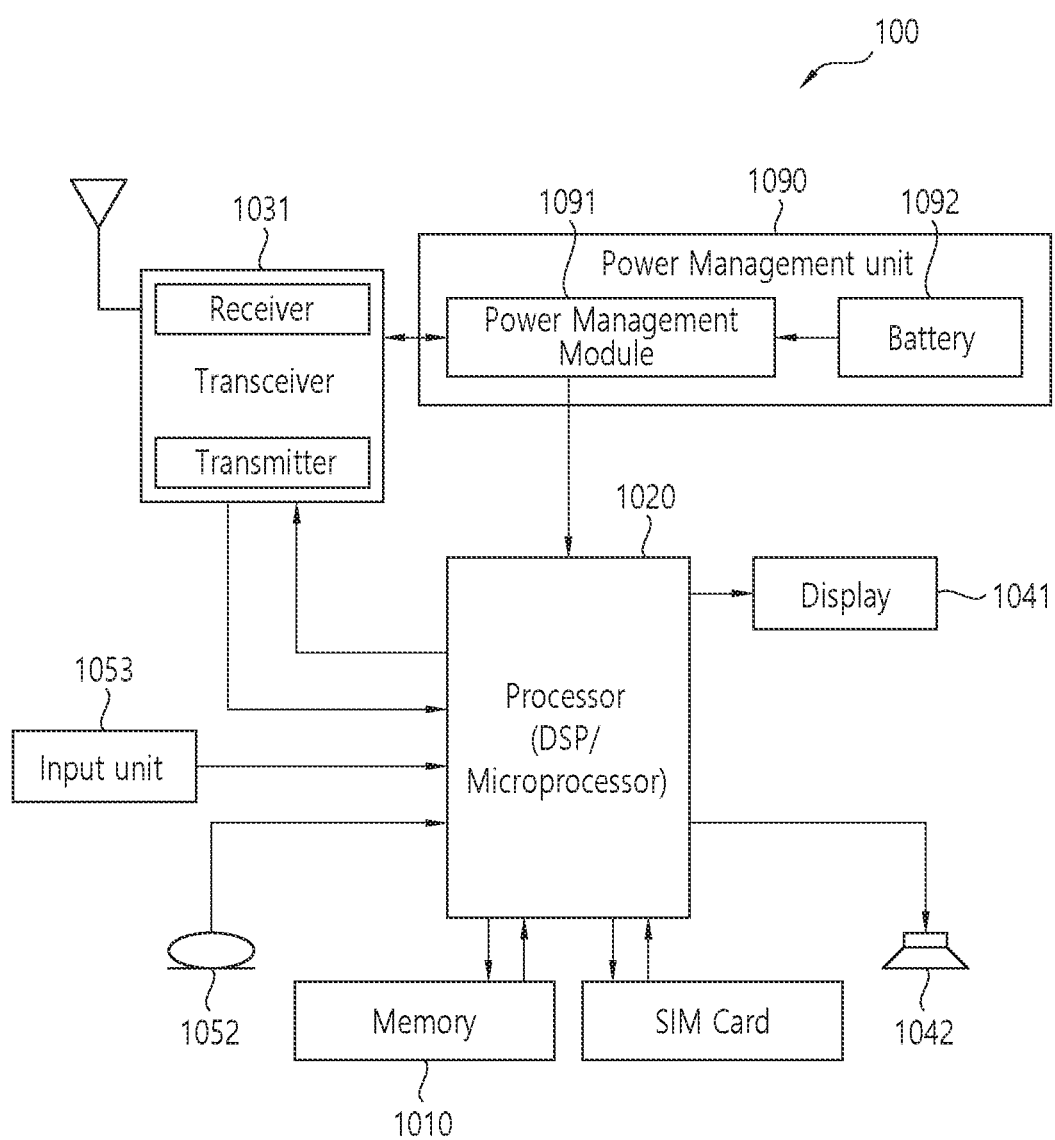
FIG. 15 is a block diagram illustrating a configuration of a UE according to an embodiment.

FIG. 15 is a Block Diagram Illustrating a Configuration of a UE According to an Embodiment.

In particular, the UE 100 shown in FIG. 15 is a diagram illustrating the first device of FIG. 13 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 16:
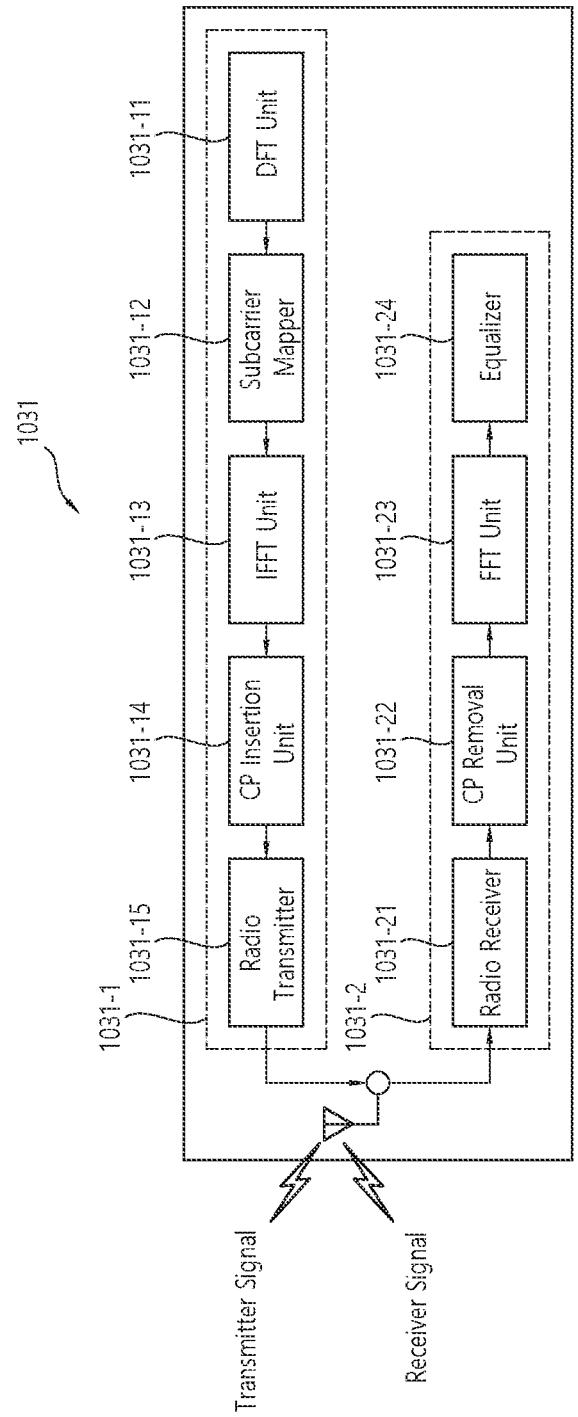
FIG. 16 is a detailed block diagram illustrating the transceiver of the first device shown in FIG. 13 or the transceiver of the device shown in FIG. 15 in detail.

FIG. 16 is a Detailed Block Diagram Illustrating the Transceiver of the First Device Shown in FIG. 13 or the Transceiver of the Device Shown in FIG. 15 in Detail.

Referring to FIG. 16, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI)

and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Figure 17:
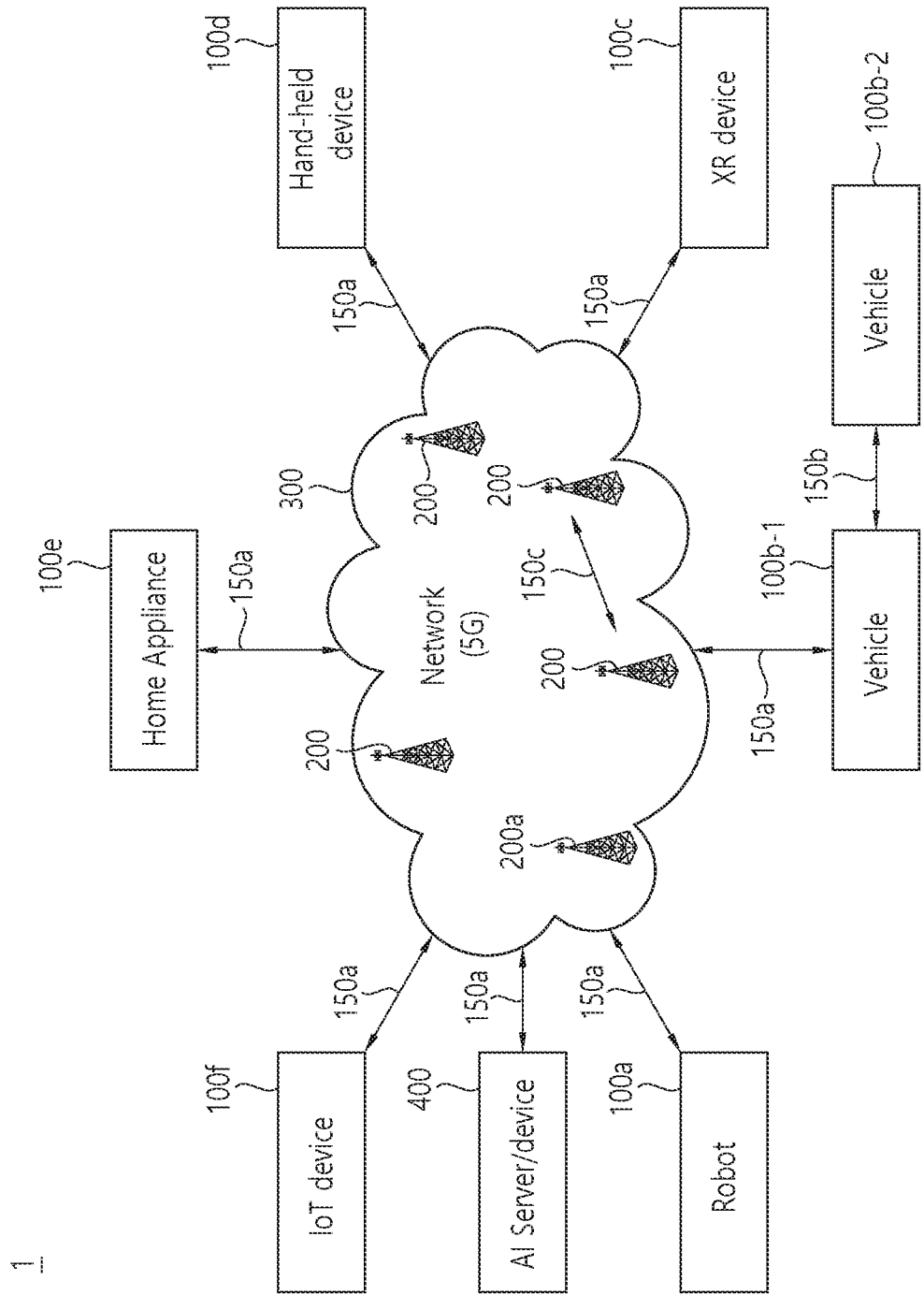
FIG. 17 illustrates a communication system 1 applied to the disclosure of the present specification.

FIG. 17 Illustrates a Communication System 1 Applied to the Disclosure of the Present Specification.

Referring to FIG. 17, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, and a home appliance 100*e*, an Internet-of-Things (IoT) device 100*f*, and an AI device/ server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

Here, the wireless communication technology implemented in the wireless devices 100*a* to 100*f*, 400, and 100 and 200 of FIG. 14 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100*a* to 100*f*, 400, 100 and 200 in FIG. 14 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100*a* to 100*f*, 400, and 100 and 200 of FIG. 14 of the present specification may include at least any one of ZigBee, Bluetooth, and low-power wide area network (Low) in consideration of low-power communication. Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100*a* to 100*f* may be connected to the network 300 via the base station 200. An Artificial Intelligence (AI) technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the base stations 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between wireless device 100*a* to 100*f* and base station 200, between base station 200/base station 200. Herein, the wireless communication/connections may be established through various RATs (e.g., 5G NR) such as uplink/downlink communication 150*a*, sidelink communication (or Device-to-Device (D2D) communication) 150*b*, inter-base station communication 150*c* (e.g., relay, Integrated Access and Backhaul (IAB)), etc. The wireless devices 100*a* to 100*f* and the base station 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method comprising:
transmitting a registration request message to a network;
receiving a registration accept message from the network in response to the registration request message;
transmitting a session establishment request message to the network;
receiving a session establishment accept message from the network in response to the session establishment request message;
receiving, from the network, first network slice information related to a network slice provided by a serving cell on a serving frequency;
receiving second network slice information related to a network slice provided by a neighboring cell on the serving frequency or on a neighboring frequency;
determining that i) the serving cell does not provide a first network slice that a user equipment (UE) intends to use based on the first network slice information, but ii) the neighboring cell provides the first network slice based on the second network slice information;
performing a first measurement on the serving cell and a second measurement on the neighboring cell;
performing slice-based cell reselection towards the neighboring cell based on i) the first measurement and the second measurement meeting cell reselection criteria, and ii) a determination that the serving cell does not provide the first network slice but the neighboring cell provides the first network slice; and
performing a registration update towards the neighboring cell.

2. The method of claim 1, further comprising:
transmitting a message requesting provision of a service related to the first network slice to the neighboring cell.

3. The method of claim 1,
wherein the second network slice information further includes information related to an offset applicable to the second measurement.

4. The method of claim 3, further comprising:
correcting a result of the second measurement by applying the offset to the second measurement based on the neighboring cell providing the first network slice.

5. The method of claim 4,
wherein the slice-based cell reselection is performed based on a corrected result of the second measurement and a result of the first measurement.

6. The method of claim 5,
wherein, when the corrected result of the second measurement is greater than the result of the first measurement, the neighboring cell is reselected.

7. The method of claim 6,
wherein the second network slice information further includes information related to an effective area of the neighboring cell,
wherein the second measurement is performed when the UE is located within the effective area of the neighboring cell.

8. The method of claim 1,
wherein the first network slice information and the second network slice information are received in a form of pseudo identifiers,
wherein the method further comprising:
identifying the network slice provided by the serving cell and the network slice provided by the neighboring cell by decoding the pseudo identifier.

9. A method comprising:
receiving, from a user equipment (UE), a registration request message including information related to a first network slice that the UE intends to use;
receiving, from the UE, a session establishment request message including information related to the first network slice;
transmitting first network slice information related to a network slice provided by a serving cell on a serving frequency;
transmitting second network slice information related to a network slice provided by a neighboring cell on the serving frequency or a neighboring frequency, and
wherein it is determined that i) the serving cell does not provide the first network slice based on the first network slice information, but ii) the neighboring cell provides the first network slice based on the second network slice information, and
wherein slice-based cell reselection is performed towards the neighboring cell based a determination that the serving cell does not provide the first network slice but the neighboring cell provides the first network slice.

10. The method of claim 9,
wherein the second network slice information further includes information related to an offset applicable to a measurement performed by the UE to determine whether to reselect the neighboring cell.

11. The method of claim 9,
wherein the second network slice information further includes information on an effective area of the neighboring cell.

12. The method of claim 9,
wherein the first network slice information and the second network slice information are transmitted in a form of pseudo identifiers.

13. A User Equipment (UE) comprising:
at least one processor; and
at least one memory operably electrically connectable with the at least one processor and storing instructions that, based on being executed by the at least one processor, perform operations comprising:
transmitting a registration request message to a network;
receiving a registration accept message from the network in response to the registration request message;
transmitting a session establishment request message to the network;
receiving a session establishment accept message from the network in response to the session establishment request message;
receiving first network slice information related to a network slice provided by a serving cell on a serving frequency;
receiving second network slice information related to a network slice provided by a neighboring cell on the serving frequency or on a neighboring frequency;

determining that i) the serving cell does not provide a first network slice that a user equipment (UE) intends to use based on the first network slice information, but ii) the neighboring cell provides the first network slice based on the second network slice information;

performing a first measurement on the serving cell and a second measurement on the neighboring cell;

performing slice-based cell reselection towards the neighboring cell based on i) the first measurement and the second measurement meeting cell reselection criteria, and ii) a determination that the serving cell does not provide the first network slice but the neighboring cell provides the first network slice; and performing a registration update towards the neighboring cell.

14. The UE of claim 13, wherein the UE is an autonomous driving device communicating with at least one of a mobile terminal, a network and an autonomous vehicle other than the UE.

* * * * *